(12) United States Patent
Singh et al.

(10) Patent No.: US 10,854,346 B2
(45) Date of Patent: Dec. 1, 2020

(54) FUEL BASKET FOR SPENT NUCLEAR FUEL AND CONTAINER IMPLEMENTING THE SAME

(71) Applicant: Holtec International, Camden, NJ (US)

(72) Inventors: Krishna P. Singh, Hobe Sound, FL (US); P. Stefan Anton, Southampton, NJ (US); Richard M. Springman, Drexel Hill, PA (US)

(73) Assignee: HOLTEC INTERNATIONAL, Camden, NJ (US)

( * ) Notice: Subject to any disclaimer, the term of this patent is extended or adjusted under 35 U.S.C. 154(b) by 208 days.

(21) Appl. No.: 15/570,790

(22) PCT Filed: May 4, 2016

(86) PCT No.: PCT/US2016/030809
§ 371 (c)(1),
(2) Date: Oct. 31, 2017

(87) PCT Pub. No.: WO2016/179297
PCT Pub. Date: Nov. 10, 2016

(65) Prior Publication Data
US 2018/0122527 A1    May 3, 2018

Related U.S. Application Data

(60) Provisional application No. 62/156,604, filed on May 4, 2015.

(51) Int. Cl.
*G21F 5/012* (2006.01)
*G21C 19/07* (2006.01)
(Continued)

(52) U.S. Cl.
CPC ............. *G21F 5/012* (2013.01); *G21C 19/07* (2013.01); *G21F 5/008* (2013.01); *G21F 5/02* (2013.01); *G21F 5/06* (2013.01); *G21C 19/40* (2013.01)

(58) Field of Classification Search
CPC ......... G21C 19/07; G21C 19/40; G21F 5/012; G21F 5/02
See application file for complete search history.

(56) References Cited

U.S. PATENT DOCUMENTS

| 4,044,267 A | 8/1977 | Bevilacqua |
|---|---|---|
| 4,177,385 A | 12/1979 | Bevilacqua |

(Continued)

FOREIGN PATENT DOCUMENTS

| CN | 86100474 | 5/1987 |
|---|---|---|
| CN | 1208495 | 2/1999 |

(Continued)

OTHER PUBLICATIONS

Corresponding International Search Report and Written Opinion for PCT/US16/30809 dated Sep. 9, 2016. WO.

*Primary Examiner* — Sharon M Davis
(74) *Attorney, Agent, or Firm* — The Belles Group, P.C.

(57) ABSTRACT

An apparatus for supporting spent nuclear fuel. The apparatus may include a basket apparatus that is designed to be inserted into a cavity of a container or cask. The basket apparatus may be formed by arranging a plurality of slotted plates in an intersecting manner. The slotted plates may form fuel cells for storing fuel assemblies with spent nuclear fuel rods therein and flux trap spaces between adjacent ones of the fuel cells. Furthermore, the apparatus may include reinforcement members positioned in the flux traps to increase the structural strength of the basket apparatus.

25 Claims, 17 Drawing Sheets

(51) Int. Cl.
*G21F 5/06* (2006.01)
*G21F 5/008* (2006.01)
*G21F 5/02* (2006.01)
*G21C 19/40* (2006.01)

(56) References Cited

U.S. PATENT DOCUMENTS

| | | |
|---|---|---|
| 4,776,366 A | 10/1988 | Czerwinski et al. |
| 4,781,883 A | 11/1988 | Daugherty et al. |
| 4,800,283 A | 1/1989 | Efferding |
| 4,930,650 A | 6/1990 | Wells |
| 5,651,038 A | 7/1997 | Chechelnitsky et al. |
| 5,926,516 A * | 7/1999 | Rudnick ............... G21C 19/40 250/518.1 |
| 6,741,669 B2 | 5/2004 | Llndquist |
| 6,778,625 B2 | 8/2004 | Ohsono et al. |
| 8,576,976 B2 | 11/2013 | Singh et al. |
| 8,630,384 B2 | 1/2014 | Carver et al. |
| 8,705,683 B2 | 4/2014 | Tamaki |
| 2002/0191730 A1 | 12/2002 | Ohsono et al. |
| 2003/0223529 A1* | 12/2003 | de la Pena ............... G21F 5/012 376/272 |
| 2008/0031396 A1 | 2/2008 | Singh et al. |
| 2008/0031397 A1* | 2/2008 | Singh ..................... G21F 5/008 376/272 |
| 2009/0175404 A1 | 7/2009 | Singh et al. |
| 2011/0122985 A1 | 5/2011 | Tamaki |
| 2018/0122527 A1 | 5/2018 | Singh et al. |

FOREIGN PATENT DOCUMENTS

| | | |
|---|---|---|
| CN | 107533873 | 1/2018 |
| JP | 2001-133590 A | 5/2001 |
| WO | 2013096966 | 6/2013 |
| WO | WO 2006/005891 | 1/2016 |

* cited by examiner

FUEL BASKET FOR SPENT NUCLEAR FUEL AND CONTAINER IMPLEMENTING THE SAME

CROSS-REFERENCE TO RELATED APPLICATIONS

This application is a U.S. national stage application under 35 U.S.C. § 371 of PCT Application No. PCT/US2016/030809, filed May 4, 2016, which claims the benefit of U.S. Provisional Application No. 62/156,604, filed May 4, 2015, the entireties of which are incorporated herein by reference.

BACKGROUND

The present invention relates generally to an apparatus for supporting spent nuclear fuel, and more specifically to a fuel basket for spent nuclear fuel and a container implementing the same. There are two different types of fuel baskets that dominate the industry: flux trap baskets and non-flux trap baskets. Flux trap baskets require an additional empty space between each fuel cell, which results in the flux trap baskets having a reduced capacity relative to non-flux trap baskets. The size of the flux trap baskets are governed by the number of cells, the size of the cells, and the thickness of the material used to form the baskets. It may be possible to increase capacity (increase the number of cells) by decreasing the thickness of the material used to form the basket while not increasing the overall area of the basket. However, material thickness is dictated by the structural resistance required to withstand regulatory normal conditions, off-normal conditions, and accident events. Thus, there is great hesitancy in the industry to reduce the material thickness, and in fact such thickness reductions without additional modification may not pass required agency approvals. Thus, a need exists for an improvement in flux trap fuel baskets that enables the wall thickness of the baskets to be decreased, thereby increasing overall capacity and performance.

BRIEF SUMMARY

The present application is directed to an apparatus for supporting spent nuclear fuel. The apparatus may include a basket apparatus that is designed to be inserted into a cavity of a container. The basket apparatus may be formed by arranging a plurality of slotted plates in an intersecting manner, although other designs for the basket apparatus that do not include use of such slotted plates may also be used to form the basket apparatus. The slotted plates may form fuel cells for storing fuel assemblies with spent nuclear fuel rods therein and flux trap spaces between adjacent ones of the fuel cells. Furthermore, the apparatus may include reinforcement members positioned in the flux traps to increase the structural strength of the basket apparatus.

In one aspect, the invention may be an apparatus for supporting spent nuclear fuel, the apparatus comprising: a plurality of wall plates arranged in an intersecting manner to define a basket apparatus extending along a longitudinal axis, the basket apparatus comprising a plurality of fuel cells and a plurality of flux traps between adjacent ones of the fuel cells; and a plurality of reinforcement members positioned in the flux traps and extending between opposing ones of the wall plates that form the flux traps.

In another aspect, the invention may be an apparatus for supporting spent nuclear fuel, the apparatus comprising: a plurality of wall plates forming a basket apparatus comprising a plurality of fuel cells and a plurality of flux traps between adjacent ones of the fuel cells; the basket apparatus extending along a longitudinal axis and comprising a top-most axial portion, a bottom-most axial portion, and a middle portion; a first set of reinforcement members positioned in lower portions of the flux traps formed by the bottom-most axial portion of the basket apparatus, the reinforcement members of the first set extending between sections of opposing ones of the wall plates that form the lower portions of the flux traps; a second set of reinforcement members positioned in upper portions of the flux traps formed by the top-most axial portion of the basket apparatus, the reinforcement members of the second set extending between sections of opposing ones of the wall plates that form the upper portions of the flux traps; and a plurality of fuel assemblies disposed in the fuel cells, each of the fuel assemblies comprising a plurality of spent nuclear fuel rods supported between two end caps.

In yet another embodiment, the invention may be an apparatus for supporting spent nuclear fuel, the apparatus comprising: a plurality of wall plates forming a basket apparatus comprising a plurality of fuel cells and a plurality of flux traps between adjacent ones of the fuel cells, the wall plates comprising reinforcement slots; a plurality of reinforcement members, each of the reinforcement members comprising a body portion and first and second flange portions protruding from opposite sides of the body portion; the reinforcement members positioned in the flux traps so that: (1) the first and second flange portions nest within the reinforcement slots of opposing ones of the wall plates that form the flux traps; and (2) the body portion abuts outer surfaces of the opposing ones of the wall plates, thereby maintaining a fixed distance between the outer surface of the opposing ones of the slotted wall plates.

In still another embodiment, the invention may be an apparatus for supporting spent nuclear fuel, the apparatus comprising: a plurality of wall plates forming a basket apparatus that extends along a longitudinal axis and comprises a plurality of fuel cells and a plurality of flux traps between adjacent ones of the fuel cells; and a plurality of reinforcement members positioned in the flux traps and extending between opposing ones of the wall plates that form the flux traps, the reinforcement members arranged in a plurality of longitudinal groups, each of the longitudinal groups comprising a subset of the reinforcement members arranged in a spaced apart manner along a group axis that is substantially parallel to the longitudinal axis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

DETAILED DESCRIPTION

Figure 1:
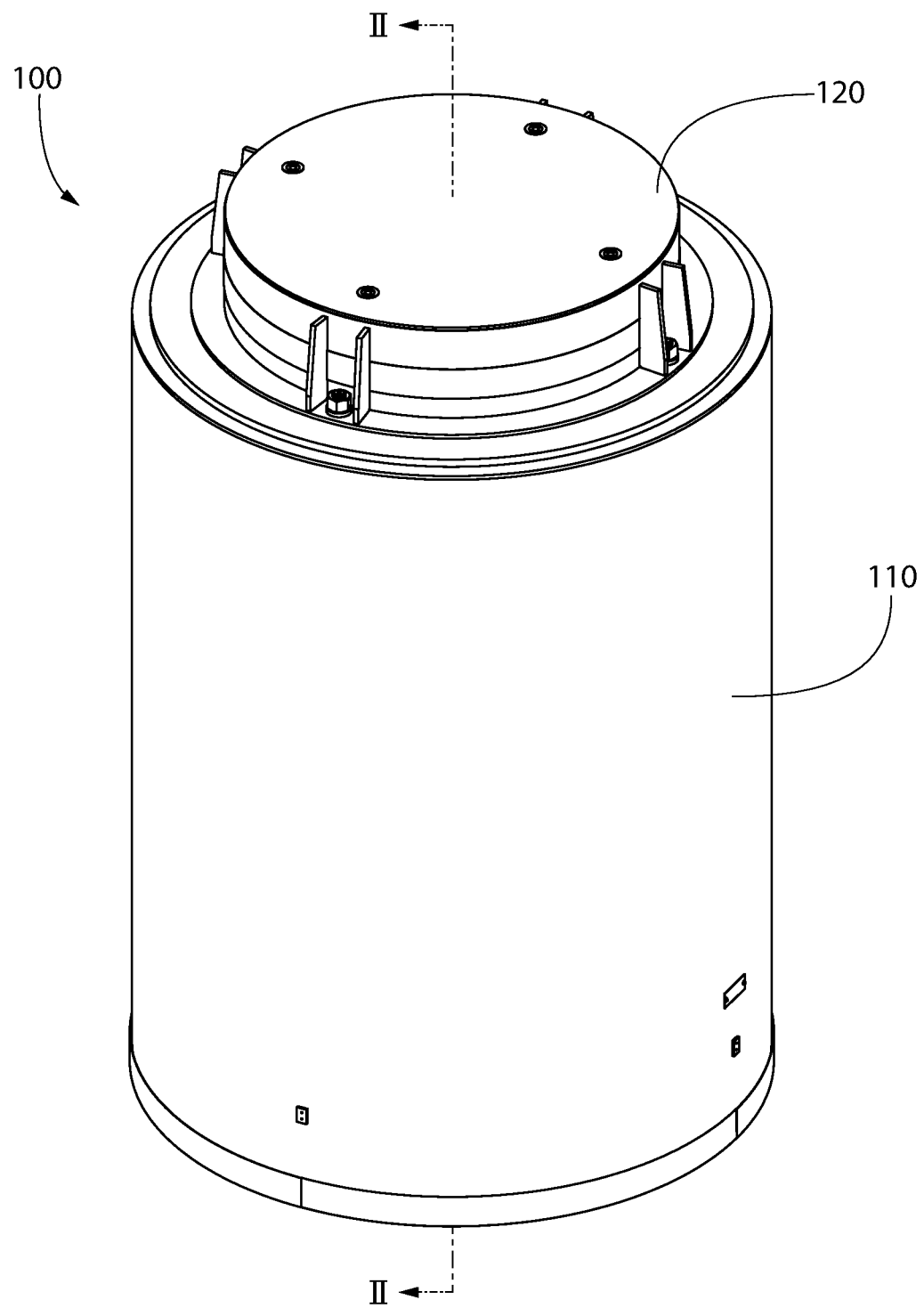
FIG. 1 is a front perspective view of a container for storing spent nuclear fuel in accordance with an embodiment of the present invention.

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Throughout the disclosure set forth herein, for certain of the components described several iterations of that component are depicted. For clarity and to avoid clutter, only some depictions of that component will be numbered.

Referring first to FIG. 1, a container 100 for storing spent nuclear fuel is illustrated. The container 100 generally comprises a container body 110 and a container lid 120 coupled to the container body 110. In certain embodiments, the container 100 may be a ventilated vertical overpack ("VVO"), which is a massive structure made principally from steel and concrete to store canisters loaded with spent nuclear fuel or other high level waste. Although the structural details of the container 100 are not described herein, it should be appreciated that the container 100 is specifically designed and is formed of specifically selected materials to provide extreme radiation blockage of both gamma and neutron radiation emanating from the high level radioactive waste stored therein. Specifically, the high level radioactive waste or spent nuclear fuel that is stored within the container 100 emits gamma and neutron radiation that must be blocked from reaching the environment due to its harmful effects. This blockage of harmful radiation is achieved with the container 100 structure and design and the structure and design of other components located within and surrounding the container 100. Furthermore, the high level radioactive waste or spent nuclear fuel that is stored within the container 100 may be extremely hot. Thus, the container 100 may also be specifically designed to facilitate a convective/no force cooling of any high level radioactive waste containers stored therein, although other techniques including forced air cooling may also be used in other embodiments. The container 100 may include casks, dual-purpose metal casks, multi-purpose canisters (MPCs), silo systems, or any other storage, repository, or transport system that contains a fuel basket structure. The specific structure of the container 100 is not to be limiting of the present invention in all embodiments unless specifically stated as such. Thus, various different container configurations are possible and may be used in accordance with the invention described herein.

Figure 2A:
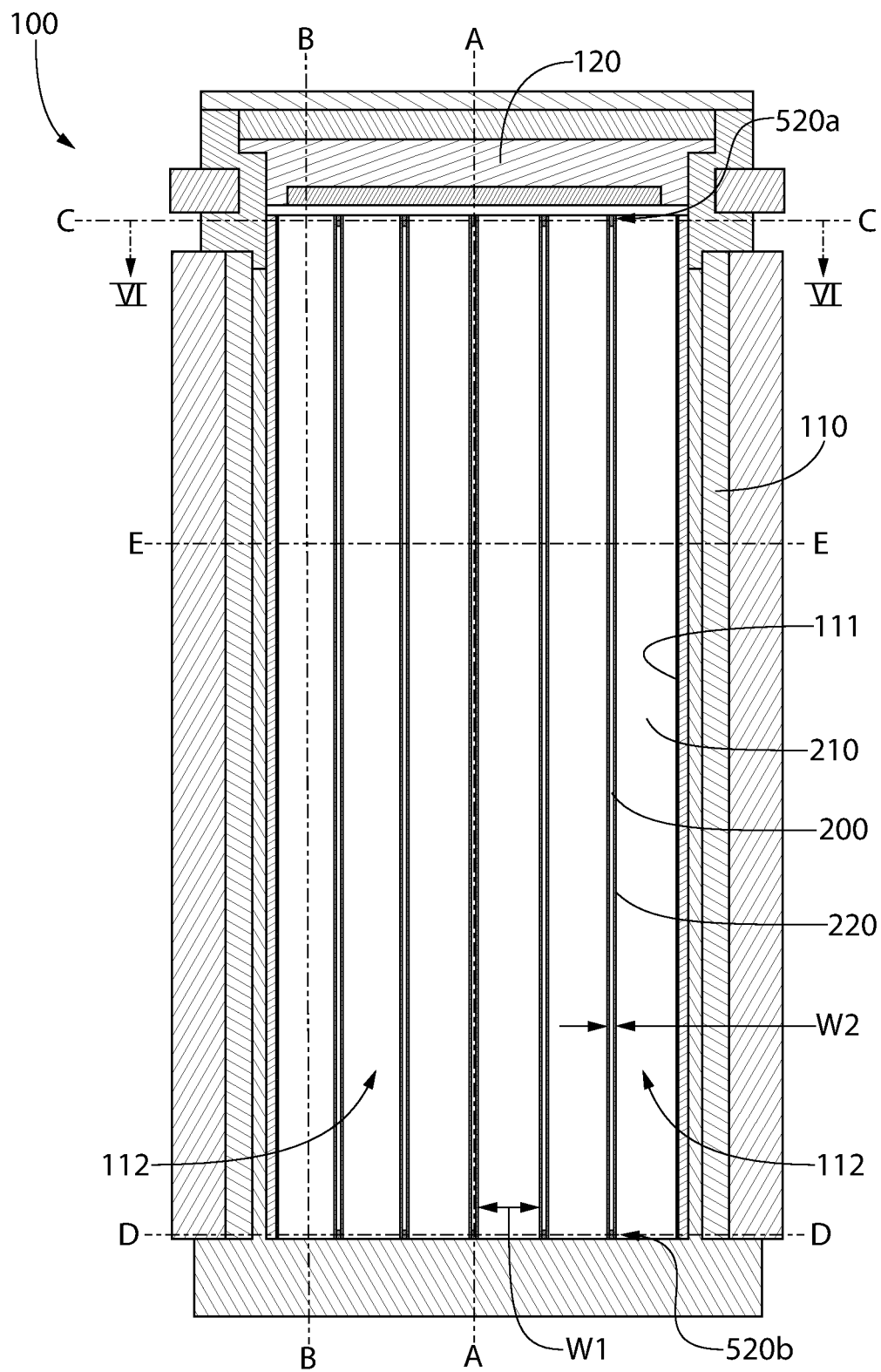
FIG. 2A is a cross-sectional view taken along line II-II of FIG. 1 showing a basket apparatus within a cavity of the container.
Figure 2B:
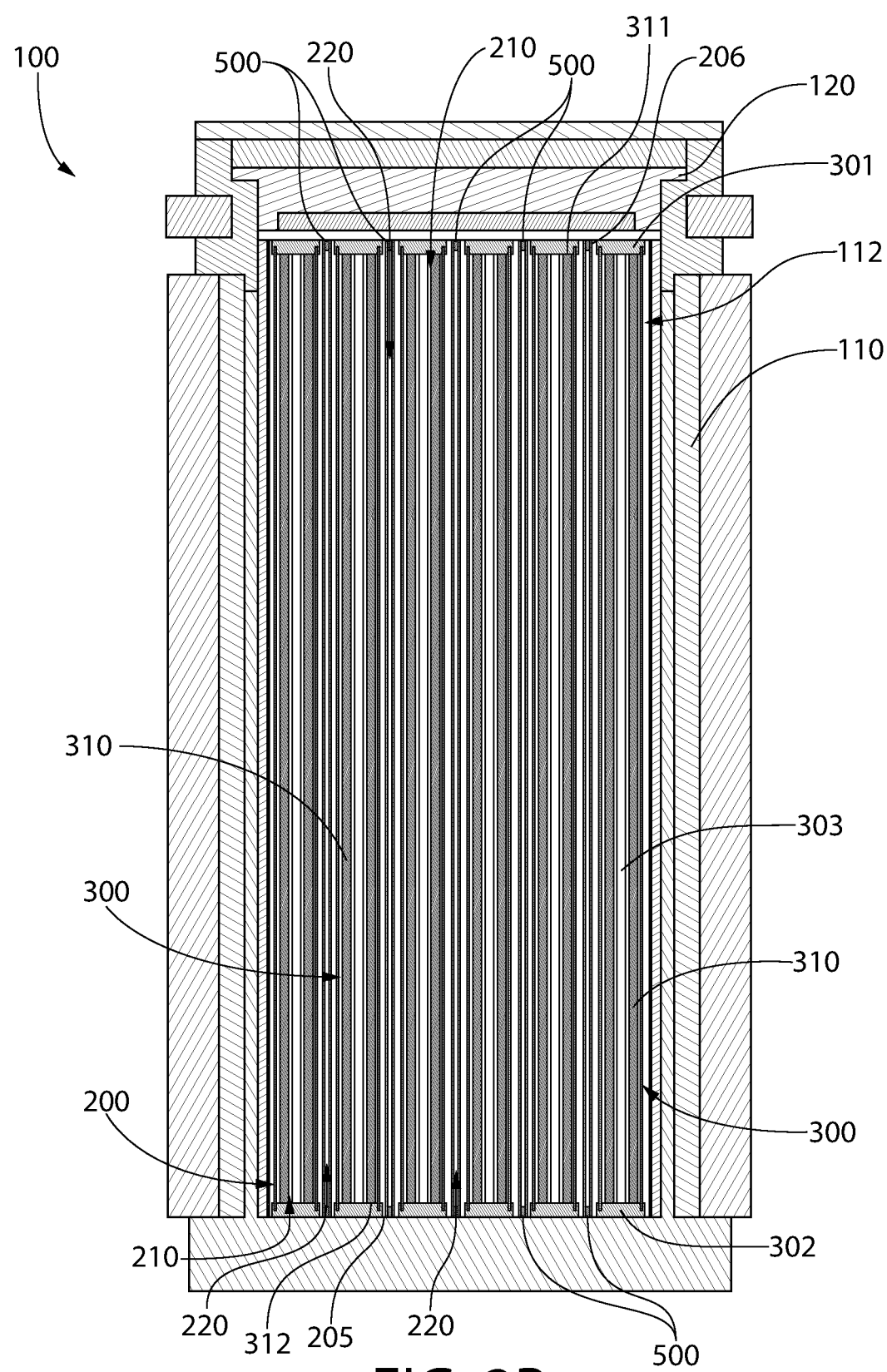
FIG. 2B is a cross-sectional view taken along line II-II of FIG. 1 showing fuel assemblies with spent nuclear fuel in the basket apparatus.

Referring to FIGS. 1, 2A, and 2B concurrently, the container body 110 has an inner surface 111 that defines a cavity 112. The container body 110 may be formed of a single layer of material or multiple different layers as illustrated. A basket apparatus 200, also referred to herein and known in the art as a fuel basket, is positioned within the cavity 112. The invention may in some embodiments be directed to an apparatus for supporting spent nuclear fuel, which apparatus may be the basket apparatus 200 by itself, or the basket apparatus 200 when disposed within the container 100.

When used to support and store spend nuclear fuel, the basket apparatus 200 is positioned within the cavity 112 of the container 100 and forms a plurality of fuel cells 210 and a plurality of flux traps 220 between adjacent ones of the fuel cells 210. Thus, the basket apparatus 200 described herein is known in the art as a flux trap basket. As discussed in more detail below, the flux traps 220 are spaces or gaps between the adjacent fuel cells 210 that may be left empty or filled with a moderator, such as water, to assist in the shielding of radiation. The design of basket apparatuses generally, and the basket apparatus 200 specifically, is dictated by the requirement to manage reactivity control in compliance with prescribed regulatory limits. Basket assemblies having flux traps are required under the standards of certain regulatory bodies and under certain circumstances (such as when highest reactivity fuel or fresh fuel is being stored). This is because basket assemblies that use flux traps are better configured to deal with high levels of radiation in nuclear fuel than basket assemblies without flux traps due to the additional radiation protection provided by the flux trap spaces and any moderator substances such as water contained therein.

FIG. 2A illustrates the cavity 112 of the container 100 with the basket apparatus 200 therein but without any spent nuclear fuel located within the basket apparatus 200. FIG. 2B illustrates the cavity 112 of the container 100 with the basket apparatus 200 therein and with fuel assemblies 300 positioned within the fuel cells 210 of the basket apparatus 200. In some embodiments each of the fuel cells 210 are sized and configured to hold no more than one of the fuel assemblies 300 therein. Furthermore, in some embodiments the flux traps 220 have a cross-sectional size and shape that is insufficient to contain any of the fuel assemblies 300 therein. Thus, the fuel assemblies 300 may be stored in the fuel cells 210, but may not be stored in the flux traps 220. Rather, the flux traps 220 always remain as a space that is free of the fuel assemblies 300.

In the exemplified embodiment a fuel assembly 300 comprising a plurality of spent nuclear fuel rods 310 is positioned and supported within each of the fuel cells 210. The fuel rods 310 are illustrated generically using grayscale, but the fuel rods 310 may be rods having a circular or other transverse cross-sectional shape and the spent nuclear fuel is disposed within the fuel rods 310. In the exemplified embodiment each of the fuel cells 210 contains one or more fuel assemblies 300, each containing a plurality of the spent nuclear fuel rods 310. However, the invention is not to be so limited in all embodiments and some of the fuel cells 210 may be left empty in alternative embodiments.

In the exemplified embodiment, each of the fuel assemblies 300 comprises a first end cap 301, a second end cap 302, and the spent nuclear fuel rods 310 extending between the first and second end caps 301, 302. The fuel assemblies 300 may also include one or more tie rods 303 for coupling the first and second end caps 301, 302 to one another. Although only one tie rod 303 is illustrated as being associated with each of the fuel assemblies 300 in the exemplified embodiment, in alternative embodiments each fuel assembly 300 may include multiple tie rods 303 and may also include tie plates to assist in holding the fuel rods 310 securely in place. In the exemplified embodiment, the first end cap 301 is located in an upper portion of the basket apparatus 200 and the second end cap 302 is located in a lower portion of the basket apparatus 200. The first and second end caps 301, 302 may be tie plates or other structures. In the exemplified embodiment, the first and second end caps 301, 302 extend axially beyond the terminal ends of the spent nuclear fuel rods 301. Stated another way, there exists a transverse axis or plane that intersects the first end caps 301 without intersecting any of the fuel rods 310 (or specifically the nuclear fuel stored therein) and separately there exists a transverse axis or plane that intersects the second end caps 302 without intersecting any of the fuel rods 310 (or specifically the nuclear fuel stored therein).

Figure 5A:
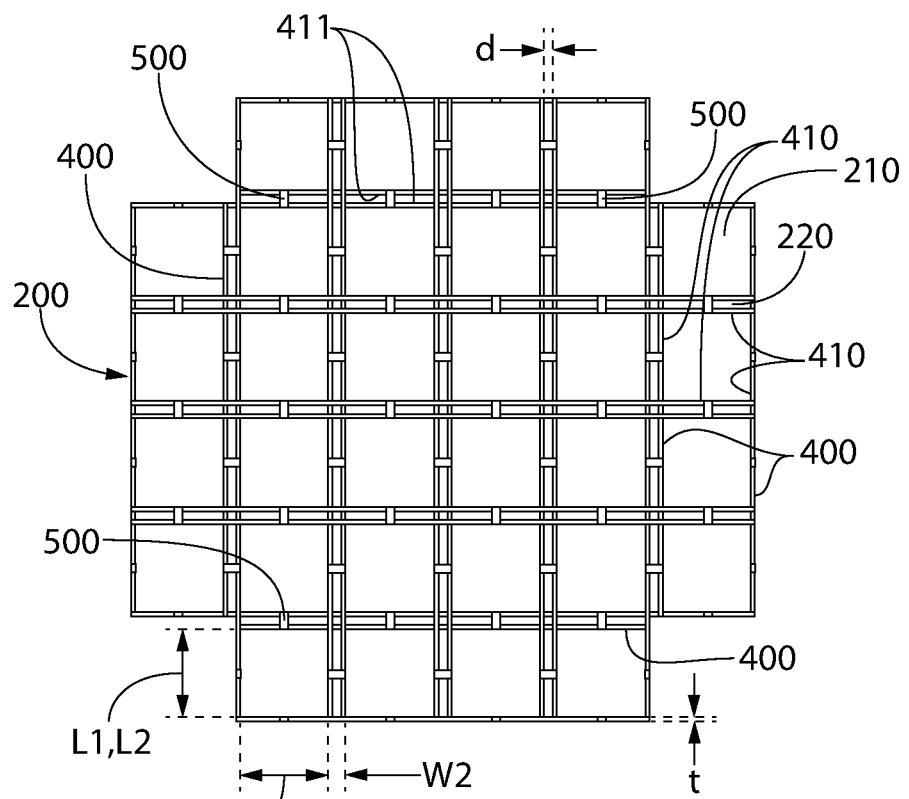
FIG. 5A is a top view of the basket apparatus of FIG. 3.

Referring briefly to FIGS. 2A and 5A concurrently, in certain embodiments each of the fuel cells 210 may have a length L1 and a width W1. Similarly, each of the flux traps 220 (or at least the portion of each of the flux traps 220 that is adjacent to an individual one of the fuel cells 210) may have a length L2 and a width W2. In the exemplified embodiment, the width W1 of the fuel cells 210 is greater than the width W2 of the flux traps 220 and the length L1 of the fuel cells 210 is the same as the length L2 of the flux traps 220. As a result, the fuel cells 210 have a greater cross-sectional area than the flux traps 220. The fuel cells 210 and the flux traps 220 may have heights that extend the entirety of the height of the basket apparatus 200, although the flux traps 220 may be at least partially interrupted by the intersecting wall plates that are used to form the basket apparatus 200 as described in more detail below.

Referring to FIGS. 3, 4, 5A, and 8 concurrently, the basket apparatus 200 will be described in accordance with an embodiment of the present invention. The basket apparatus 200 is formed by a plurality of wall plates 400 that are arranged in an intersecting manner to form and define the basket apparatus 200. More specifically, referring to FIG. 8, each of the wall plates 400 is a slotted wall plate such that the wall plates 400 may be interlocked with one another in an intersecting manner to form the basket apparatus 200. In the exemplified embodiment, each of the wall plates 400 comprises an upper edge 401, a lower edge 402, a plurality of plate slots 403 formed into each of the upper and lower edges 401, 402, and a plurality of reinforcement slots 404 formed into at least one of the upper and lower edges 401, 402.

Although the plate slots 403 are illustrated as being formed into each of the upper and lower edges 401, 402 of the wall plates 400, the invention is not to be so limited and for some of the wall plates 400, for example the upper-most wall plates in the basket apparatus 200, the wall plates 400 may include plate slots 403 in the lower edge 402 but not also in the upper edge 401. The plate slots 403 in each of the wall plates 400 are sized and configured to receive an intersecting one of the wall plates 400 to form the basket apparatus 200. Thus, the plate slots 403 may be positioned and designed to achieve a desired overall basket apparatus structure.

In the exemplified embodiment, the reinforcement slots 404 are illustrated as being formed into both of the upper and lower edges 401, 402 of the wall plates 400. However, the invention is not to be so limited in all embodiments and the reinforcement slots 404 may be formed into only the upper edges 401 or only the lower edges 402 of the wall plates 400 in other embodiments. As will be described in greater detail below, the reinforcement slots 404 provide a location at which a reinforcement member 500 may be coupled to the wall plate 400. Thus, the reinforcement slots 404 are only needed on edges of the wall plates 400 that are intended to retain one of the reinforcement members 500. In some embodiments, some of the wall plates 400 are configured to retain a reinforcement member 500 and therefore will include reinforcement slots 404 in at least one of its upper or lower edges 401, 402 while others of the wall plates 400 will not include any reinforcement slots because such wall plates 400 may not perform any function related to the reinforcement members 500. Furthermore, in some embodiments the reinforcement slots 404 are not needed and the reinforcement members 500 may be coupled to the wall plates 400 without being retained within reinforcement slots 404. Nonetheless, in some embodiments for simplicity the wall plates 400 may all be formed identical with reinforcement slots 404 regardless of whether they are used to retain a reinforcement member 500.

Figure 8:
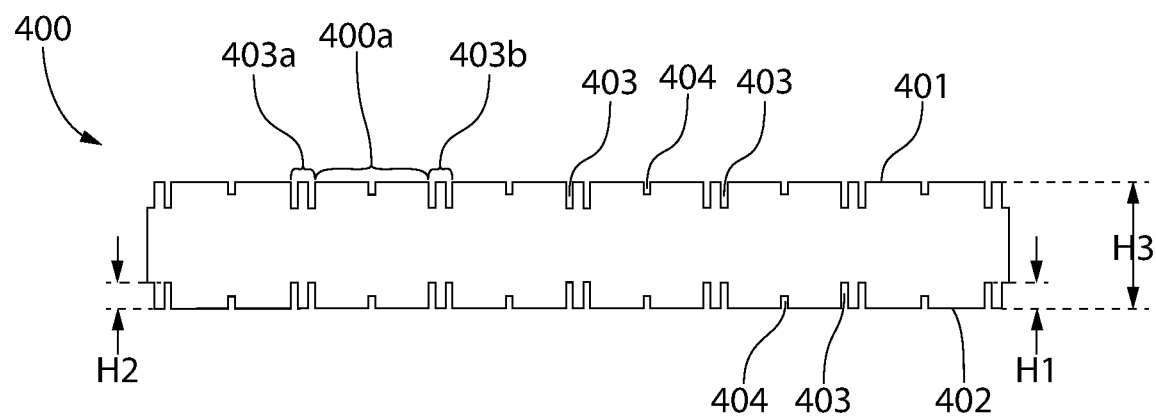
FIG. 8 is a front view of a wall plate that may be used to form the basket apparatus of FIG. 3.

In the exemplified embodiment, the plate slots 403 have a first height H1 and the reinforcement slots 404 have a second height H2. The heights of the plate slots 403 and the reinforcement slots 404 are measured from the upper or lower edge 401, 402 into which the plate and reinforcement slots 403, 404 are formed to a terminal end of the plate and reinforcement slot 403, 404. In the exemplified embodiment, the second height H2 of the reinforcement slots 404 is less than the first height H1 of the plate slots 403. As seen in FIG. 8, the plate slots 403 and the reinforcement slots 404 of the wall plates 400 are arranged in a pattern comprising a repeating sequence of reinforcement slot, plate slot, plate slot. Of course, other arrangements are possible depending upon the overall desired shape of the basket apparatus 200.

In the exemplified embodiment, the reinforcement slots 404 are formed between a first closely spaced pair of the plate slots 403*a* and a second closely spaced pair of the plate slots 403*b*. Specifically, the wall plate 400 has sets of two of the plate slots 403 that are closely spaced. The space in between the intersecting wall plates 400 that are positioned within each set of two closely spaced plate slots forms one of the flux traps 220 of the basket apparatus 200. The space in between adjacent ones of the sets of two of the plate slots 403 that are used to form the flux traps 220 is a portion of the wall plate 400 that is intended to form a part of one of the fuel cells 210. In the exemplified embodiment, the reinforcement slots 404 are centrally positioned between each set of two closely spaced plate slots 403. However, the invention is not to be so limited in all embodiments and other arrangements and positioning of the plate slots 403 and the reinforcement slots 404 relative to one another may be possible in other embodiments.

Figure 3:
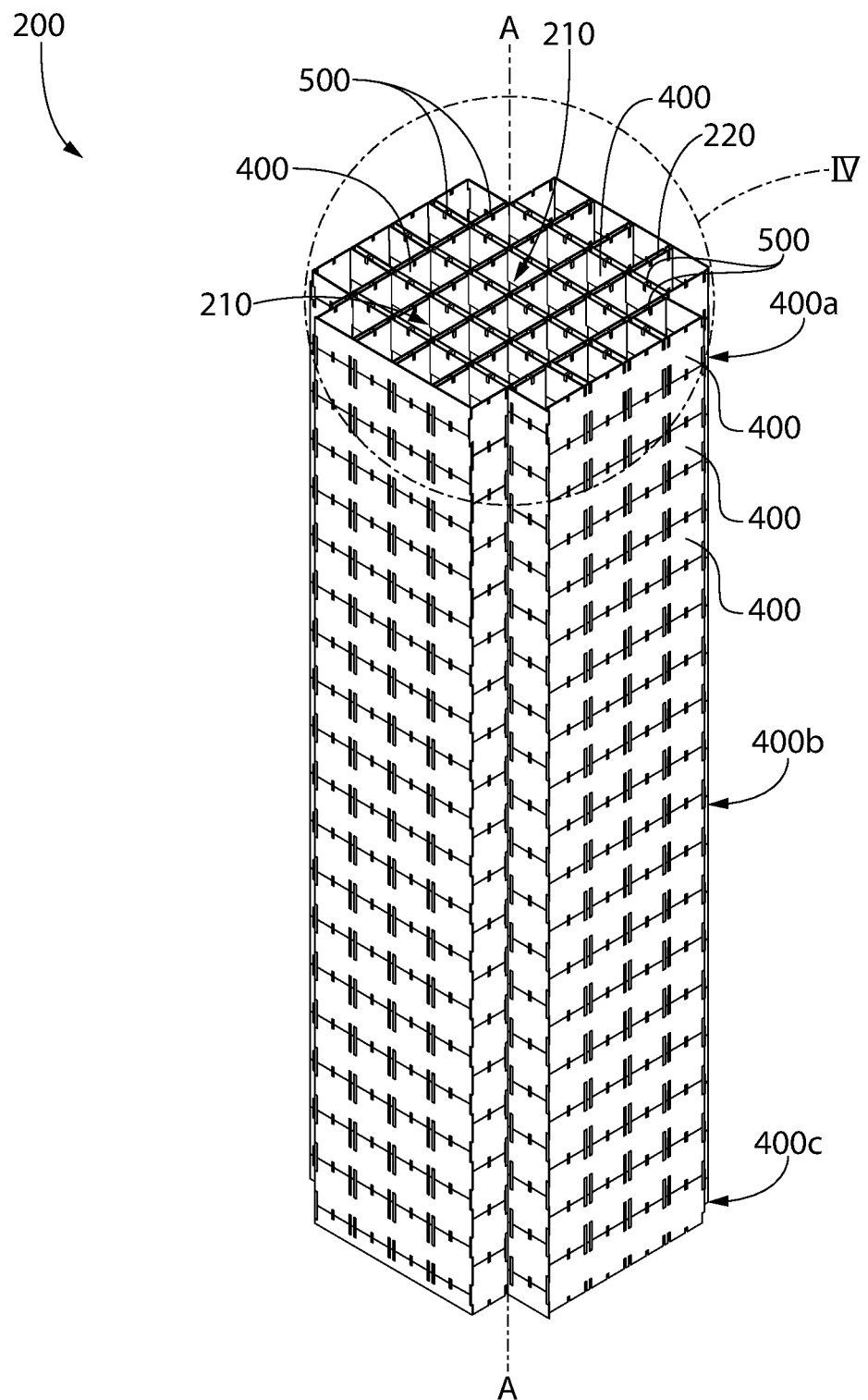
FIG. 3 is a perspective view of a basket apparatus in accordance with an embodiment of the present invention.
Figure 4:
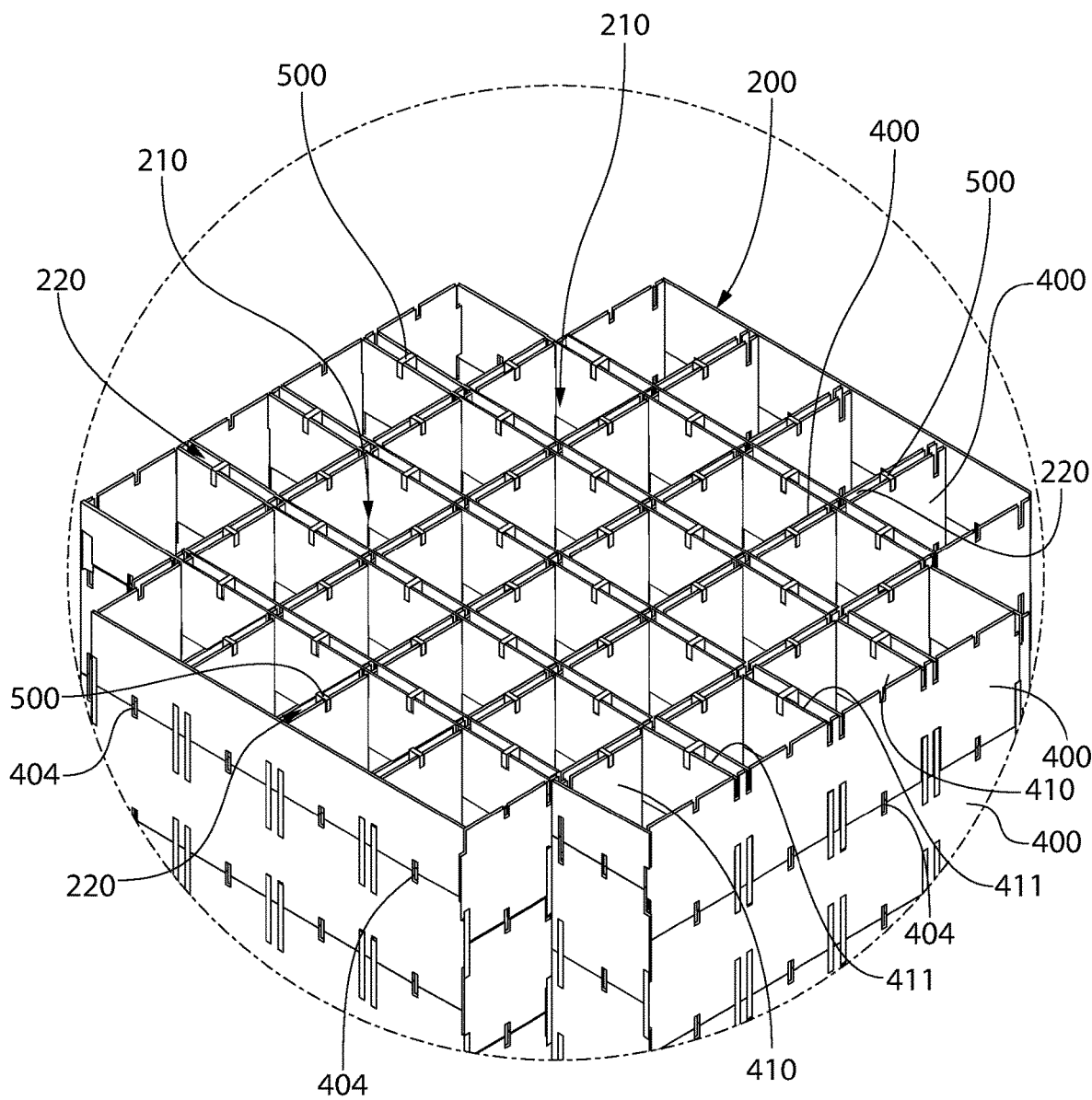
FIG. 4 is a close-up view of area IV of FIG. 3.

Referring to FIGS. 3, 4, and 5A concurrently, the basket apparatus 200 is illustrated that has been formed by a plurality of the wall plates 400 being arranged in an intersecting manner as has been described in detail above. Specifically, the basket apparatus 200 is formed by placing a first set of the wall plates 400 in a parallel and spaced apart arrangement. Then, a second set of the wall plates 400 are positioned in a parallel and spaced apart arrangement that is orthogonal to the orientation of the first set of wall plates 400. Next, the plate slots 403 of the wall plates 400 of the first set are aligned with the plate slots 403 of the wall plates 400 of the second set, and the intersecting/orthogonal wall plates 400 are coupled to one another by inserting the wall plates 400 of the first set into the plate slots 403 of the wall plates 400 of the second set and vice versa. Thus, the plate slots 403 of each of the wall plates 400 receive an intersecting one of the wall plates 400 therein. This operation continues as the basket apparatus 200 is built up axially, which results in the assembly of the basket apparatus 200.

As noted herein above, the basket apparatus 200 comprises a plurality of fuel cells 310 for storing fuel assemblies of spent nuclear fuel therein and a plurality of flux traps 220 between adjacent ones of the fuel cells 210. In the exemplified embodiment, there is a flux trap 220 between each adjacent pair of the fuel cells 210. However, the invention is not to be so limited in all embodiments and the basket apparatus 200 may be a combination flux trap/non-flux trap basket such that not every adjacent fuel cell 210 is separated by one of the flux traps 220.

Figure 5B:
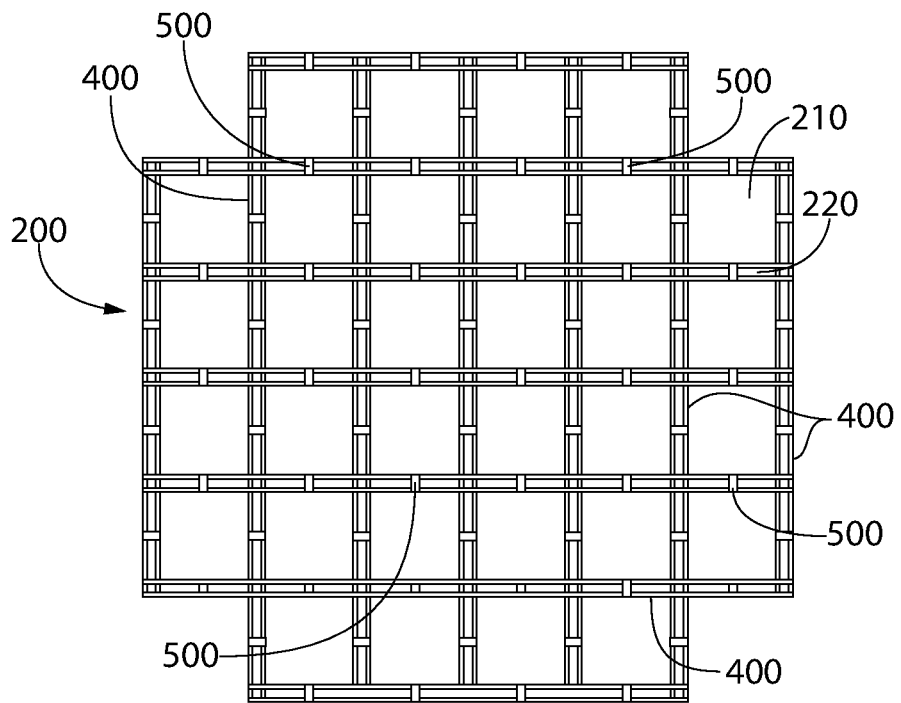
FIG. 5B is a top view of a basket apparatus in accordance with a first alternative embodiment of the present invention.

In the exemplified embodiment, each of the wall plates 400 has an inner surface 410 and an outer surface 411. For a first one of the wall plates 400 and a second one of the wall plates 400, the inner surfaces 410 of the first and second ones of the wall plates 400 face one another. For the second one of the wall plates 400 and a third one of the wall plates, the outer surfaces 411 of the second and third ones of the wall plates 400 face one another. The inner surfaces 410 of the wall plates 400 bounds a portion of one of the fuel cells 210. Specifically, in the exemplified embodiment the inner surfaces 410 of four wall plates 400 collectively form or bound one of the fuel cells 210. The outer surfaces 411 of the wall plates 400 bounds a portion of one of the flux traps 220. Specifically, in the exemplified embodiment the outer surfaces 411 of two adjacently positioned wall plates 400 collectively form one of the flux traps 220. Thus, in one embodiment each wall plate 400 forms, defines, or bounds a portion of one of the fuel cells 210 and a portion of one of the flux traps 220. In one alternative embodiment, the peripheral wall plates 400 may only define a portion of one of the fuel cells 210 and not also a portion of one of the flux traps 220, as shown in FIG. 5A. In another alternative embodiment, the peripheral-most wall plates 400 may only define a portion of one of the flux traps 220 and not also a portion of one of the fuel cells 210, as shown in FIG. 5B.

The flux traps 220 are designed to have a particular width W2 to facilitate decreasing radiation and eliminating the danger of criticality. In some embodiments, the flux traps 220 have a width W2 between 20 mm and 30 mm, more specifically between 22 mm and 28 mm, and still more specifically approximately 26 mm. However, the invention is not to be so limited in all embodiments and the exact width of the flux traps 220 may be outside of the range noted herein depending on radiation levels of the fuel assemblies to be stored therein. As described above, in the exemplified embodiment the wall plates 400 form and define the flux traps 220. In some embodiments, the wall plates 400 have a wall thickness t of between 7 mm and 14 mm, and more specifically approximately 10 mm. Of course, thicknesses of the wall plates 400 outside of the aforementioned range may also be permissible in some embodiments.

In certain embodiments, the wall plates 400 have a thickness t and the flux traps 220 have a width W2. There are two walls plates 400 that bound each of the flux traps 220, such that the combined thickness of the flux traps 220 and the walls bounding them is 2t+W2. In previous basket apparatuses, the wall thickness t has been maintained at a predetermined minimum value to ensure that reactivity control is maintained below regulatory limits regardless of the level of reactivity of the fuel stored therein and to ensure proper thermal conductivity. Furthermore, the wall thickness t has been selected to ensure that it can withstand regulatory normal, off-normal, and accident conditions (i.e., structural rigidity). One major consideration in fuel basket design is that it must withstand inertial impact loads, such as a severe inertial loading event that might cause a free fall in the horizontal direction leading to an impact with a hard surface or a sudden tip-over of the cask from a vertical orientation. Under such events, the fuel assembly 300 bearing on the wall plate 400 acts to deform it and the wall plate 400 must be adequately stiff to withstand the exerted load. Thus, two important considerations for the structural resistance of the wall panel 400 are: (1) ensuring that deflection is maintained below acceptable limits for reactivity control; and (2) ensuring that the wall panels 400 are not compromised. These are some of the many factors that go into determining the appropriate wall thickness t. Regardless, in order to ensure safe operation, and to also maximize capacity, t is selected to be a specific value and 2t+W2 is selected to be a specific value.

Using the inventive concepts described below, it has been found that the value of t may be decreased while maintaining 2t+W2 at the same level, thereby increasing the width of the flux traps 220 and increasing the volume of water that can be placed within the flux trap spaces. Alternatively, it has been found that the value of t may be decreased without increasing the width of the flux traps 220, thereby increasing the overall capacity of the flux trap fuel apparatus 200 relative to those previously known and used. Furthermore, the value of t may be decreased while the value of W2 is increased but less than the decrease in the value of t, which results in an increase in capacity while also increasing the width of the flux trap spaces for enhanced performance. Even with these modifications to the values of t and W2, the structural rigidity and other performance characteristics and regulatory requirements remain met due to the inclusion of the reinforcement members 500 which will be described in greater detail below. Specifically, the reinforcement members 500 are located within the flux traps 220 and span between and abut the outer surfaces 411 of the wall plates 400 that bound the flux traps 220, which significantly reduces the amount of deflection of the wall panels 400 because the reinforcement members 500 will reinforce the wall panels 400 and maintain the width W2 of the flux trap 220. Thus, the reinforcement members 500 provide a means to reduce the wall panel 400 thickness and maintain adequate structural strength and thermal performance in the basket apparatus 200.

Still referring to FIGS. 3, 4 and 5A, as noted above the wall plates 400 are arranged in an intersecting manner to define the basket apparatus 200. The basket apparatus 200 extends along a longitudinal axis A-A. The fuel cells 210 and the flux traps 220 are formed by the spaces between the intersecting wall plates 400, with the larger cross-sectional area spaces forming the fuel cells 210 and the relatively smaller cross-sectional area spaces forming the flux traps 220. In this embodiment, the fuel cells 210 have square or rectangular cross-sectional shapes, although the invention is not to be so limited in all embodiments. Furthermore, as illustrated in these figures, the reinforcement slots 500 are positioned in the flux traps 220 and extend between opposing ones of the wall plates 400 that form the flux traps 220. Specifically, the reinforcement slots 500 extend between, and may abut and be coupled directly via welding, bolting, or the like, to the outer surfaces 411 of the wall plates 400 that face one another and form the flux traps 220.

Specifically, the wall plates 400 are arranged in pairs of closely spaced wall plates 400 that have opposing outer surfaces 411 that face one another that form the flux traps 220. Thus, the flux traps 220 are formed or defined by the outer surfaces 411 of two closely spaced parallel wall plates 400, and more specifically by the opposing outer surfaces 411 thereof that face one another. The pairs of closely spaced wall plates 400 are spaced apart from other pairs of closely spaced wall plates 400 by a distance (the width W1 of the fuel cells 210) that is greater than the distance (the width W2 of the flux traps 220) between the closely spaced wall plates 400 (because the width W1 of the fuel cells 210 is greater than the width W2 of the flux traps 220). The spaces between the pairs of closely spaced wall plates 400 form the fuel cells 210. More specifically, each of the fuel cells 210 is formed in the space between by two parallel wall plates 400 extending in a first direction and the space between two parallel wall plates 400 extending in a second direction that is orthogonal to the first direction.

Figure 6:
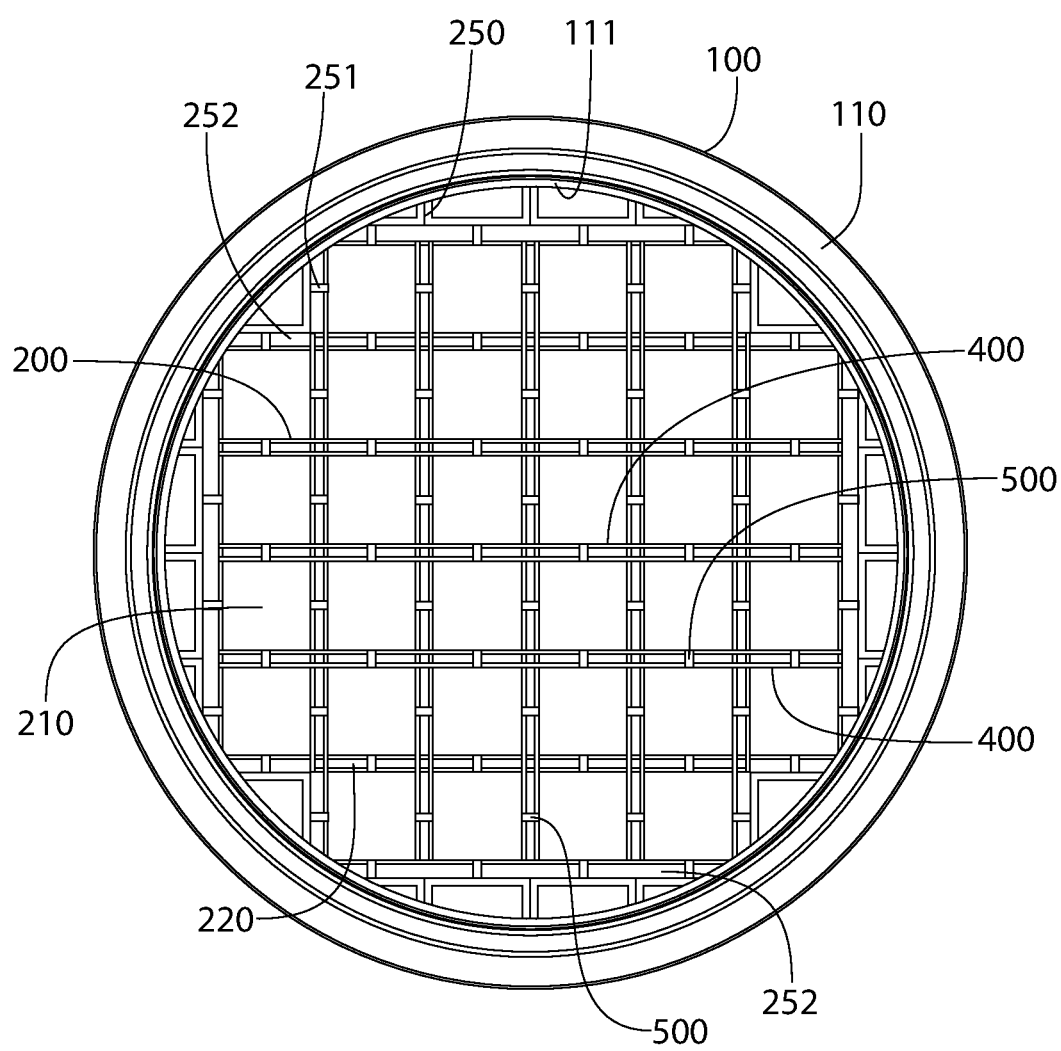
FIG. 6 is a cross-sectional view taken along line VI-VI in FIG. 2A.

In the exemplified embodiment, each of the fuel cells 210 except for the outermost fuel cells 210 is surrounded by flux traps 220 and the outermost fuel cells 210 are surrounded on two sides by flux traps 220. Referring to FIG. 6, in such an embodiment, when the basket apparatus 200 is positioned within the cavity 112 of the container 100, a basket spacer 250 may be included that circumscribes the basket apparatus 200. Specifically, the basket spacer 250 may be positioned between the inner wall 111 of the container body 110 and the basket apparatus 200 to maintain proper spacing between the basket apparatus 200 and the inner wall 111 of the container body 110. In some embodiments, the basket spacer 250 may be spaced apart from the basket apparatus 200 using reinforcement members 251 to form additional flux traps 252 between the basket apparatus 200 and the basket spacer 250.

In an alternate embodiment shown in FIG. 5B, each of the fuel cells 210 may be completely surrounded by the flux traps 220. In still other embodiments, the basket apparatus 200 may be a combination flux trap/non-flux trap fuel basket such that there are rows of flux traps 220 in both directions that the wall plates 400 extend centrally located within the basket apparatus 200 but the outer regions of the basket apparatus 200 are free of flux traps. Thus, variations are possible within the scope of the present invention.

Figure 9:
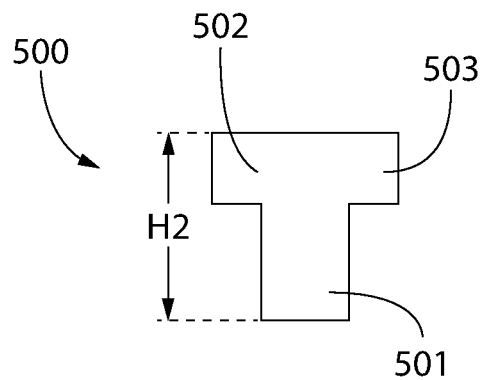
FIG. 9 is a front view of a reinforcement member in accordance with an embodiment of the present invention.

Referring briefly to FIG. 9, the reinforcement member 500 is illustrated in accordance with one embodiment of the present invention. In the exemplified embodiment, the reinforcement member 500 comprises a body portion 501, a first flange portion 502, and a second flange portion 503. The first and second flange portions 502, 503 protrude from opposite sides of the body portion 501. Thus, in the exemplified embodiment the reinforcement member 500 is a "T" shaped member. The reinforcement members 500 may be a T-shaped plate. Furthermore, in some embodiments the reinforcement members 500 may comprise a flat plate that extends substantially orthogonal to the opposing ones of the wall plates 400 between which the reinforcement member 500 extends. Of course, the invention is not to be so limited in all embodiments and the reinforcement member 500 may have a different shape.

Figure 11A:
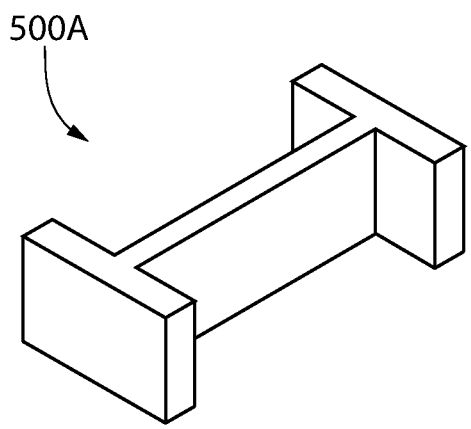
FIGS. 11A-11D are perspective views of reinforcement members in accordance with alternative embodiments of the present invention.
Figure 11B:
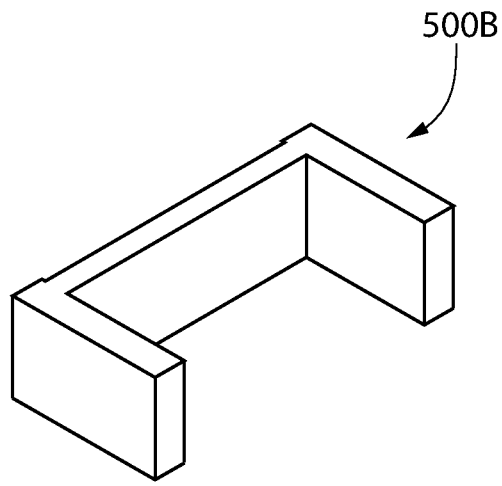
Figure 11C:
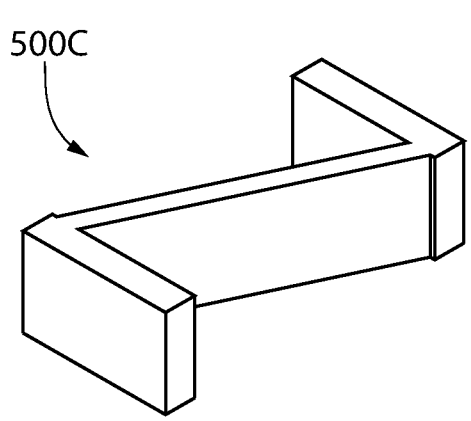
Figure 11D:
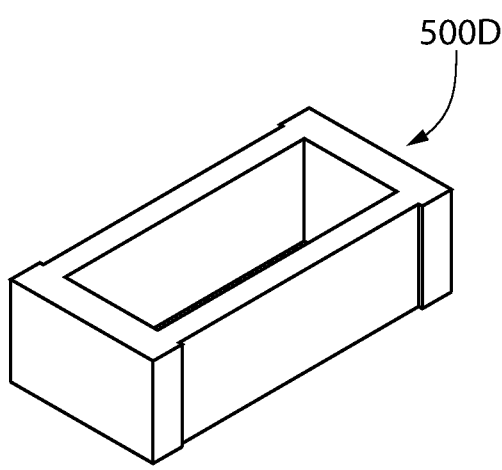

For example, in some embodiments the reinforcement members 500 may be cruciform shaped rather than T-shaped. Such cruciform shaped reinforcement members 500 will readily fit within the reinforcement slot 404 in the upper edge 401 of one wall plate 400 and an aligned reinforcement slot 404 in the lower edge 402 of another wall plate 400 that is axially adjacent to the one wall plate 400. Thus, this will increase the structural rigidity in the slotted wall plate basket apparatus 200. This will be more readily understood upon reading the discussion of the assembly of the basket apparatus 200 below. FIGS. 11A-11D show alternative embodiments for the reinforcement members 500a-d, particularly showing their transverse cross-sectional shapes. Thus, the reinforcement members 500A may be I-shaped as shown in FIG. 11A, the reinforcement members 500B may be C-shaped as shown in FIG. 11B, the reinforcement members 500C may be Z-shaped as shown in FIG. 11C, or the reinforcement members 500D may be square/rectangular shaped. Combinations of differently shaped reinforcement members 500 may also be utilized in the same basket apparatus 200 in some embodiments.

Furthermore, although in FIGS. 11A-11D the reinforcement members 500A-D are illustrated as having a particular length, this is not to be limiting of the invention in all embodiments. As discussed in greater detail below, the reinforcement members 500 described herein may have an axial height that is less than the height of the basket apparatus 200, and several of the reinforcement members 500 may be coupled to the basket apparatus 200 in a transversely aligned and axially spaced apart manner to provide the necessary structural rigidity to the basket apparatus 200. This may be desirable because it leaves a greater volume of the flux trap 220 space open. Alternatively, the reinforcement members 500 may have a height that is sufficient to enable a single reinforcement member 500 to extend the entire height of the basket apparatus 200. This may be desirable for ease of assembly and manufacturing. This will be discussed below with reference to FIGS. 13 and 14.

Figure 10A:
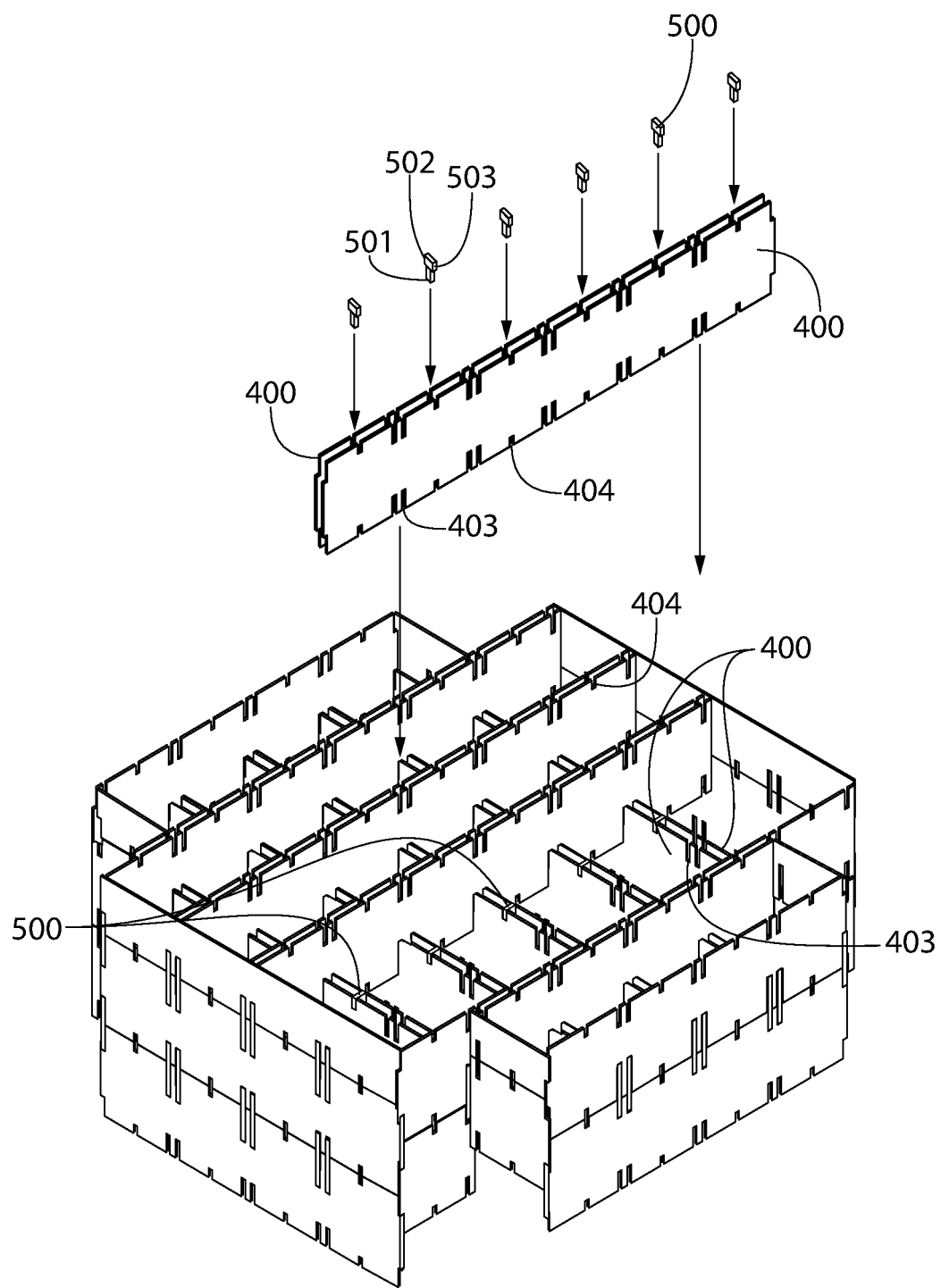
FIGS. 10A-10C are perspective views illustrating assembly of the basket apparatus and reinforcement members of FIG. 3.
Figure 10B:
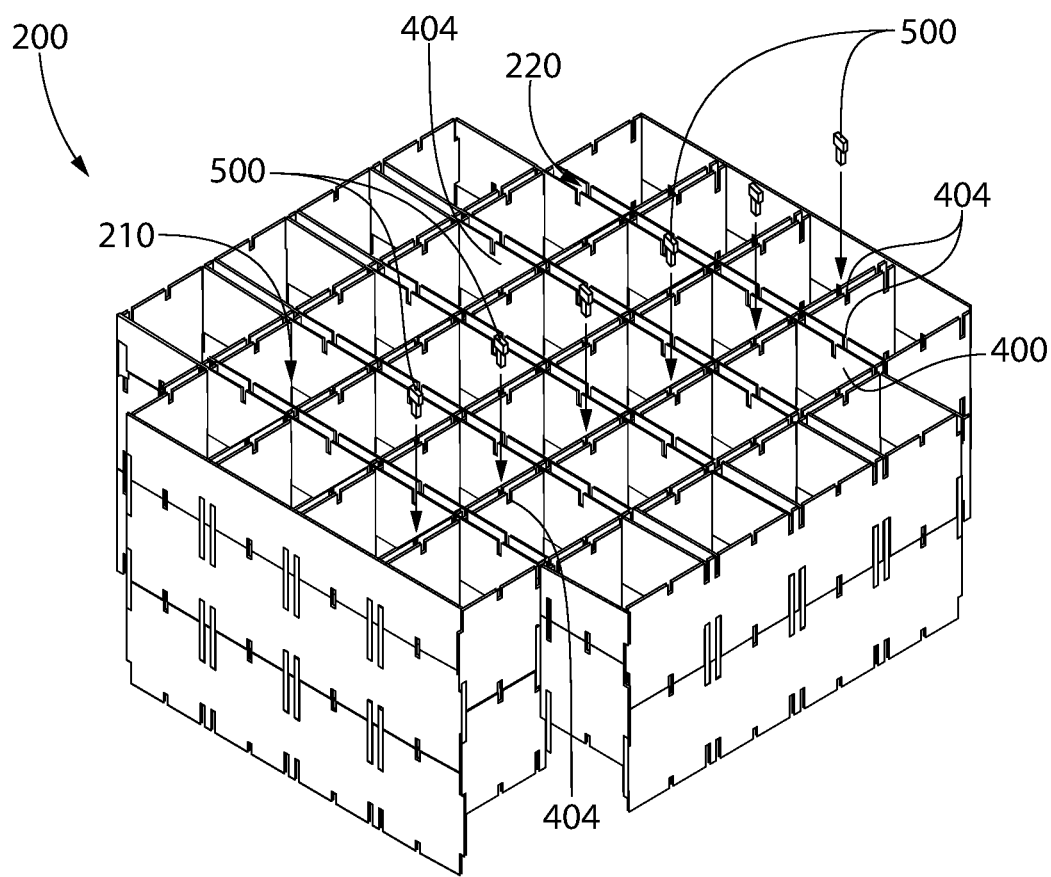
Figure 10C:
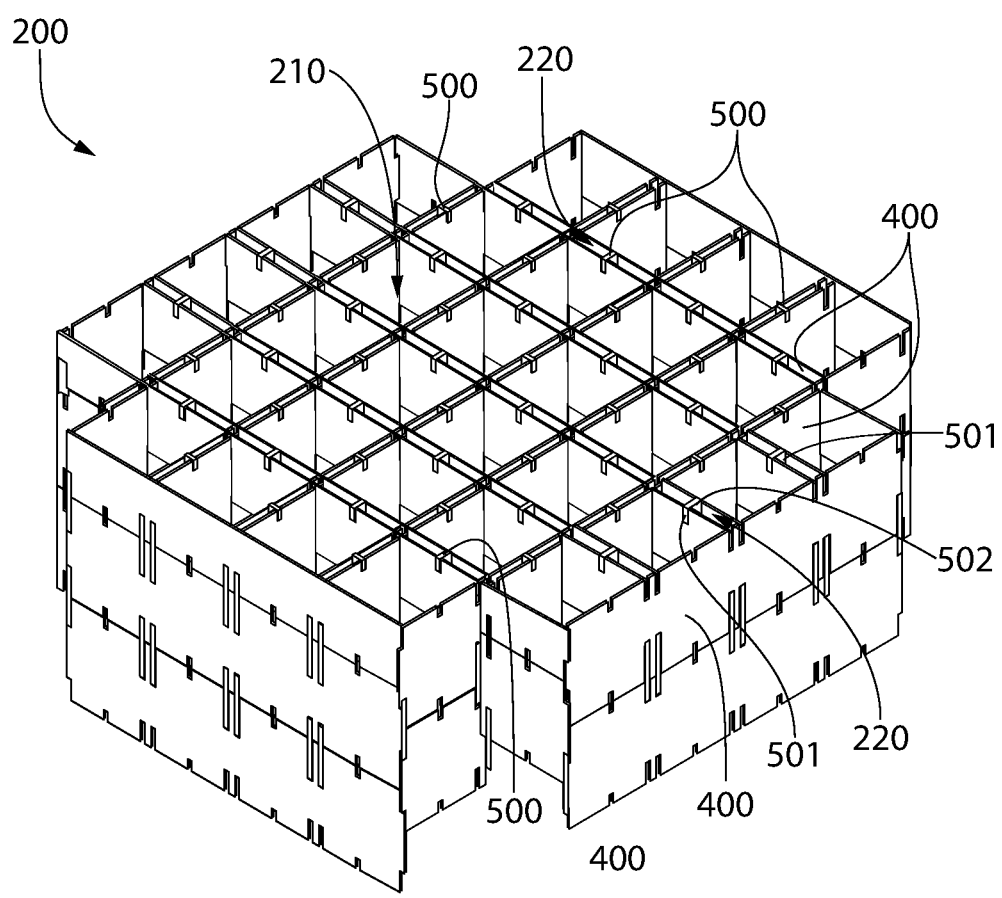

Referring to FIGS. 10A-10C, assembly of the basket apparatus 200 from the wall plates 400 and coupling of the reinforcement members 500 thereto will be described in accordance with one embodiment of the present invention. As noted above, the wall plates 400 are arranged in an intersecting manner. Specifically, a first set of the wall plates 400 are positioned in a parallel and spaced apart manner. Then, a second set of the wall plates 400 are positioned in a parallel and spaced apart manner orthogonal to the first set of wall plates 400. The second set of wall plates 400 are positioned atop of the first set of wall plates 400 with the plate slots 403 of the first and second sets of the wall plates 400 axially aligned with one another so as to cooperatively secure the first set of wall plates 400 to the second set of wall plates 400. Each parallel grouping of the wall plates 400 forms an axial section of the basket apparatus 200. This process continues until the basket apparatus 200 has a desired overall height.

FIG. 10A illustrates the basket apparatus 200 partially assembled with two of the wall plates 400 positioned in preparation for being assembled onto others of the wall plates 400 that are already assembled in the partially formed basket apparatus 200. Within the assembled portion of the basket apparatus 200, some of the reinforcement members 500 are visible secured to the wall plates 400 via the reinforcement slots 404 thereof. In some embodiments, the reinforcement members 500 may be included throughout the basket apparatus 200 nested within each of the reinforcement slots 404. Thus as each layer (or axial segment) of the basket apparatus 200 is formed, reinforcement members 500 may be coupled to the wall plates 400 of that layer so that the reinforcement members 500 are interspersed throughout the basket apparatus 200. In others of the embodiments, some of the reinforcement slots 404 of the wall plates 400 that are assembled into the basket apparatus 200 may include reinforcement members 500 therein while others may not include reinforcement members 500. Thus, the structural arrangement of the basket apparatus 200 formed using the intersecting wall plates 400 permits variation in the positioning of the reinforcement members 500 as desired. The reinforcement members 500 do not need to be located at every reinforcement slot 404 so long as there are a sufficient number of them to ensure that the flux traps 220 (i.e., the gaps between the outer surfaces 411 of the wall plates 400) do not close under loading events as described above. Specifically, a sufficient number of the reinforcement members 500 should be included in the basket apparatus 200 to prevent the wall plates 400 from deflecting towards one other during loading or other non-normal conditions.

In FIG. 10A, some of the reinforcement members 500 are illustrated exploded away from the basket apparatus 200 and from the wall plates 400 that are about to be assembled onto the basket apparatus 200. The two wall plates 400 that are not yet assembled will be positioned so that their plate slots 403 will engage the plate slots 403 of the wall plates 400 directly below. This engagement of the plate slots 403 of the axially adjacent plates 400 secures the plates 400 together to form the basket apparatus 200. The axially adjacent plates 400 may also be welded or bolted together for an additional structural rigidity, although this is not required in all embodiments and the interaction of the plate slots 403 alone may be sufficient without additional welding or bolting.

FIG. 10B illustrates the basket apparatus 200 with the wall plates 400 that were previously not formed onto the basket apparatus 200 assembled. In FIG. 10B, the reinforcement members 500 are illustrated exploded away from the basket apparatus 200 in preparation for coupling thereto.

Referring to FIGS. 10B and 10C concurrently, after the wall plates 400 are assembled, the reinforcement members 500 are positioned within the reinforcement slots 404. Specifically, each of the reinforcement members 500 is sized and shaped to be secured to the wall plates 400 and to fit within the flux trap 220. In the exemplified embodiment, the first and second flange portions 502, 503 of the reinforcement members 500 are positioned so as to nest within the reinforcement slots 404 of opposing ones of the wall plates 400 between which the reinforcement member 500 extends. In that regard, the wall plates 400 that form the flux traps 220 each have at least one of the reinforcement slots 404 formed therein. Specifically, as noted above two adjacent ones of the wall plates 400 form each of the flux traps 220. The two adjacent wall plates 400 each have a plurality of the reinforcement slots 404 formed therein such that the reinforcement slots 404 on one of the wall plates 400 forming/defining the flux trap 220 are aligned with the reinforcement slots 404 on the other one of the wall plates 400 forming/defining the same flux trap 220.

Thus, the first flange portion 502 of the reinforcement member 500 nests within the reinforcement slot 404 of one of the wall plates 400 and the second flange portion 503 of the reinforcement member 500 nests within the reinforcement slot 404 of an opposing one of the wall plates 400. As a result, the body portions 501 of the reinforcement members 500 extend into the flux trap 220 that spans between the two wall plates 400 that the first and second flange portions 502, 503 of the reinforcement member 500 are coupled to. The two wall plates 400 that the reinforcement connector 500 couples to collectively define one of the flux traps 220, and thus the reinforcement member 500 is located within the flux trap 220. More specifically, with the first and second flange portions 502, 503 of the reinforcement member 500 nested within the reinforcement slots 404 of the opposing or adjacent wall panels 400, the body portion 501 of the reinforcement member 500 extends into the flux trap 220 and abuts the outer surfaces 411 of the opposing wall plates 400 that face one another. In this manner, the body portions 501 of the reinforcement members 500 maintain a fixed distance between the opposing ones of the wall plates 400 between which the reinforcement member 500 extends. Due to the body portions 501 of the reinforcement members 500 abutting the outer surfaces 411 of the opposing wall plates 400 that form the flux traps 220 (which may be each flux trap in some embodiments), the reinforcement members 200 work in tandem to increase the structural strength of the basket apparatus 200 and prevent deflection of the wall panels 400 as described herein.

FIG. 10C illustrates the basket apparatus 200 with one of the reinforcement members 500 positioned within every pair of reinforcement slots 404 formed into adjacent ones of the wall panels 400 forming the flux traps 220. Of course, there does not need to be a reinforcement member 500 within every pair of reinforcement slots 404 in all embodiments, and some of the reinforcement slots 404 may be left empty and free of a reinforcement member 500 therein.

Figure 7A:
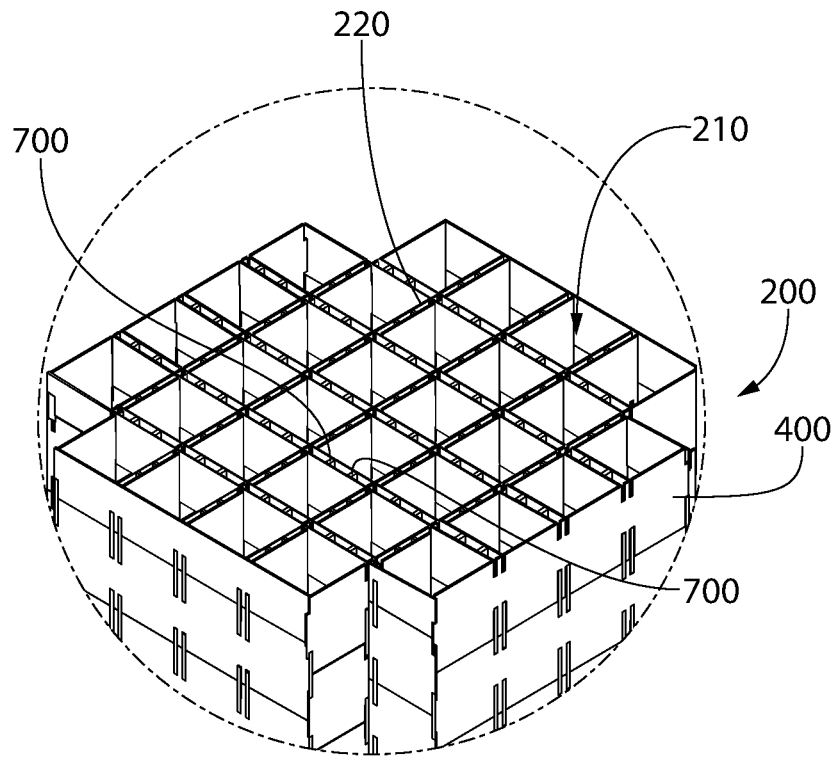
FIG. 7A is a perspective view of a portion of a basket apparatus in accordance with a second alternative embodiment of the present invention.
Figure 7B:
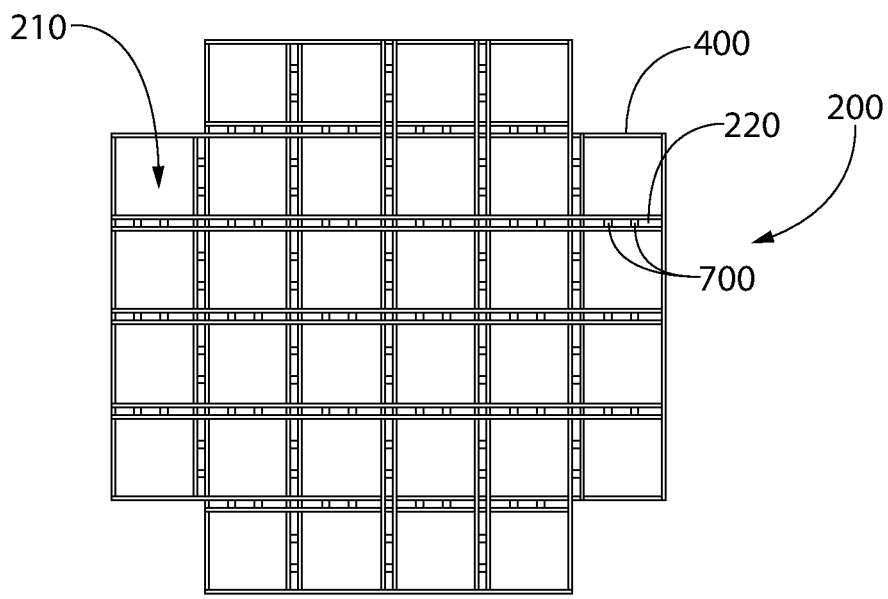
FIG. 7B is a top view of the basket apparatus of FIG. 7A.

In the exemplified embodiment, each of the fuel cells 210 is defined by an enclosed geometry formed by a portion of four of the wall plates 400 (although it may be more than four of the wall plates 400 depending on the shape of the fuel cells 210). In the exemplified embodiment, for each of the portions of the four wall plates 400 that form the fuel cells 210, the reinforcement members 500 are centrally located along that portion of the wall plate 400. Stated another way, each of the fuel cells 210 extends along an axis B-B (see FIG. 2A) that is substantially parallel to the longitudinal axis A-A of the basket apparatus 200. For each adjacent pair of the fuel cells 210, a longitudinal reference plane that extends between and includes the fuel axes B-B of the adjacent pair of the fuel cells 210 intersects at least one of the reinforcement members 500. This occurs due to the central location of the reinforcement members 500 along the portion of the wall plates 400 forming each fuel cell 210. Of course, the invention is not to be so limited in all embodiments and the reinforcement members 500 may be positioned at other locations along the wall panels 400, an example of which is shown in FIGS. 7A and 7B and described below.

As noted above, in certain embodiments each of the wall panels 400 that is used to form the basket apparatus 200 is an identical construction. Thus, each of the wall panels 400 may include the reinforcement slots 404 for retaining the reinforcement members 500. In some embodiments the reinforcement members 500 may be coupled to each of the wall panels 400 at each of the reinforcement slots 404. Thus, the reinforcement members 500 may be positioned throughout the basket apparatus 200 along its axial height. However, the structure of the basket apparatus 200 using the wall panels 400 allows for a great deal of variation. Specifically, the reinforcement members 500 may only be coupled to some of the wall panels 400 and/or at some of the reinforcement slots 404.

Referring to FIGS. 8 and 9, in one embodiment the wall panels 400 may have a height H3 measured between the upper and lower edges 401, 402. Furthermore, the reinforcement members 500 may have a height H4. The height H4 of the reinforcement members 500 may be less than the height H3 of the wall panels 400. In one embodiment, the height H4 of the reinforcement members 500 may be less than or equal to one-half of the height H3 of the wall panels 400. This enables one of the reinforcement members 500 to nest within the reinforcement slot 404 in the upper edge 401 of the wall panel 400 while another one of the reinforcement members 500 nests within the reinforcement slot 404 in the lower edge 401 of the same wall panel 400 that is aligned with the reinforcement slot 404 in the upper edge 401 without the reinforcement members 500 overlapping one another.

FIGS. 2A and 2B illustrate one embodiment of the internal features of the container 100 with the basket apparatus 200 therein. In this embodiment, the reinforcement members 500 are positioned only at the top end of the basket apparatus 200 and at the bottom end of the basket apparatus 200. Specifically, in this embodiment the reinforcement members 500 comprise a first set 520a of the reinforcement members located adjacent a top end of the basket apparatus 200 and a second set 520b of the reinforcement members located adjacent a bottom end of the basket apparatus 200. The first and second sets 520a, 520b may be separate and distinct components in some embodiments. In this embodiment a first transverse reference plane C-C (transverse to the longitudinal axis A-A of the basket apparatus 200) exists that intersects each of the reinforcement members 500 of the first set 520a of reinforcement members. A second transverse reference plane D-D (transverse to the longitudinal axis A-A of the basket apparatus 200) exists that intersects each of the reinforcement members 500 of the second set 520b of reinforcement members. Furthermore, a third transverse reference plane E-E (transverse to the longitudinal axis A-A of the basket apparatus 200) exists axially between the first and second transverse reference planes C-C, D-D. In the exemplified embodiment, due to the reinforcement members 500 being located only at the top and bottom ends of the basket apparatus 200, the third transverse reference plane E-E does not intersect any of the reinforcement members 500.

By positioning the reinforcement members 500 at the top and bottom of the basket apparatus 200 only, it is possible that the reinforcement members 500 are not transversely aligned with any of the spent nuclear fuel. Specifically, as seen in FIG. 2B, the fuel rods 310 do not extend the entire length of the fuel cell 210, but rather extend between the first and second end caps 301, 302. Thus, the fuel rods 310 extend from a first end 311 that is spaced from a top-most end 206 of the basket apparatus 200 to a second end 312 that is spaced from a bottom-most end 205 of the basket apparatus 200. The first set 520a of reinforcement members 500 are located within the axial space between the first end 311 of the fuel rods 310 and the top-most end 206 of the basket apparatus 200. The second set 520b of reinforcement members 500 are located within the axial space between the second end 312 of the fuel rods 310 and the bottom-most end 205 of the basket apparatus 200. Thus, in this embodiment no portion of the fuel rods 310 is aligned with the reinforcement members 500. Stated another way, there is no transverse plane that intersects a portion of the fuel rods 310 and one or more of the reinforcement members 500.

This arrangement may be advantageous for the following reasons. The fuel rods 310 are known to emanate radiation in the transverse direction. The reinforcement members 500 take up some of the valuable volume of the flux traps 220 that would otherwise be filled with water or some other modulator/radiation shielding material. Because the reinforcement members 500 are not aligned with the fuel rods 310 in this embodiment, the reinforcement members 500 do not interfere with the radiation shielding and the full width of the flux traps 220 that is adjacent to the fuel rods 310 in the transverse direction is available for radiation shielding (either by itself or via being filled with a radiation shielding material). Of course, additional reinforcement members 500 may be included within the flux traps in axial alignment with the reinforcement members 500 of the first and second sets 520a, 520b to provide additional structural rigidity to the basket apparatus 200 in some embodiments.

Referring to FIGS. 2A, 2B, and 3 concurrently, the above will be described in a different way with specific mention of the wall plates 400. In the exemplified embodiment, the wall plates 400 include a plurality of first wall plates 400a, a plurality of second wall plates 400b, and a plurality of third wall plates 400c. The first wall plates 400a form a top-most axial section of the basket apparatus 200. The third wall plates 400c form a bottom-most axial section of the basket apparatus 200. The second wall plates 400b form one or more middle axial sections of the basket apparatus 200. Each axial section of the basket apparatus 200 is defined by a plurality of the wall plates 400 that are all intersected by the same transverse reference plane.

In this embodiment, it may be the case that the second wall plates 400b are formed of a metal matrix material having neutron absorbing particular reinforcement. Thus, the second wall plates 400b may be formed of a material that shields against neutron radiation. Furthermore, in this embodiment the first and third wall plates 400a, 400c may be formed of stainless steel. Stainless steel does not shield against neutron radiation to the same degree that the metal matrix of the second wall plates 400b does. Thus, in this embodiment it is preferable to not include fuel rods in transverse alignment with the first and third wall plates 400a, 400c.

Furthermore, in this same embodiment, the reinforcement members 500 may also be formed of stainless steel. In one embodiment, the reinforcement members 500 formed of stainless steel may be located only in portions of the flux traps that are formed by the top-most axial section (i.e., the first wall plates 400a) and the bottom-most axial section (i.e., the third wall plates 400c) of the basket apparatus 200. In this embodiment, the end caps 301, 302 may be transversely aligned with the top-most axial section formed by the first wall plates 400a and the bottom-most axial section formed by the third wall plates 400c. However, it may be preferable that the fuel rods 310 do not extend into the top-most axial section and the bottom-most axial section of the basket apparatus 200.

In embodiments that use wall plates 400 formed of stainless steel and reinforcement members 500 formed of stainless steel, the reinforcement members 500 may be welded to the steel plates 400. Furthermore, in all embodiments disclosed herein it is possible for the reinforcement members 500 to be welded, bolted, combinations thereof, or otherwise mechanically fastened to the wall plates 400 defining the flux trap 220 within which the reinforcement members 500 are positioned either alternative to or in addition to the reinforcement members 500 nesting within the reinforcement slots 404 as disclosed herein.

Referring briefly to FIGS. 7A and 7B, the basket apparatus 200 is illustrated with an alternative arrangement of reinforcement members 700. The basket apparatus 200 and the reinforcement members 700 are identical to the similar structures/components described above except with regard to the differences specifically noted herein below. First, in this embodiment the reinforcement members 700 are not illustrated with flanges that interact with slots in the wall plates 400. Rather, in this embodiment the reinforcement members 700 are illustrated such that they are fastened to the wall plates 400 via welding, bolting, or the like as described herein above. Of course, this arrangement of the reinforcement members 700 may also be coupled to the wall plates 400 using flanges and slots are described above. In this embodiment, the reinforcement members 700 are illustrated as flat rectangular plates rather than T-shaped plates because there is no longer a need for the T-flanges. Of course, other shapes are possible and fall within the scope of this disclosure. For example, the reinforcement members 700 may include additional material/flanges to ensure a proper weld or bolted engagement between the reinforcement members 700 and the wall plates 400.

Another difference between this embodiment and those previously described is in the positioning and arrangement of the reinforcement members 700 within the flux traps 220. Specifically, in this embodiment rather than having one reinforcement member 700 (or a plurality of axially spaced reinforcement members) positioned within each flux trap 220 space at the center-point of that particular flux trap 220 space, this embodiment includes two reinforcement connectors 700 within each flux trap 220 space situated symmetrically from the mid-plane of the portion of the wall plates 400 defining the flux trap 220. Thus, multiple of the reinforcement members 700 may be positioned within one of the flux traps 220 that bounds one side of a single fuel cell 210. In the exemplified embodiment, the two reinforcement members 700 that are positioned within a single flux trap 220 space are equidistantly spaced from the center-point of that flux trap 220 space. However, variations in the arrangement, positioning, and number of the reinforcement members 700 within a single flux trap space 220 are possible.

Although variations are possible, in certain embodiments it is preferable that the reinforcement members 500, 700 described herein be positioned into abutting contact with side surfaces of the wall plates 400 that define the flux traps 220 and the fuel cells 210 rather than the corners thereof. Stated another way, each of the fuel cells 210 has a polygonal shape, which is a square in the exemplified embodiment (although other shapes are possible). The polygonal shape of the fuel cells 210 has a plurality of sides and a plurality of corners. The reinforcement members 500, 700 are positioned adjacent to and aligned with the sides of fuel cells 210 (or the sides of the plates that define the fuel cells 210) rather than the corners of the fuel cells 210. This is because the reinforcement members 500, 700 are intended to prevent these walls frin deflecting or moving towards one another during certain conditions. The reinforcement members 500, 700 would not achieve this purpose if positioned at the corners of the fuel cells 210 rather than along the sides of the fuel cells 210.

The flux traps 220 may be considered to extend transversely in intersecting directions orthogonal to the longitudinal axis A-A of the basket apparatus 200 along the entire length and width of the basket apparatus 200. As used herein, a single flux trap space refers to a portion of the flux traps that bound a portion of one of the fuel cells 210. Specifically, each fuel cell 210 (or at least each fuel cell 210 other than the peripheral-most fuel cells) is bounded by portions of four flux traps 220. Those portions of the four flux traps are each referred to herein as a single flux trap. Thus, in the embodiment of FIGS. 7A and 7B, there are two reinforcement members 700 positioned within each of the portions of the four flux traps 220 that bound each of the fuel cells 210.

Figure 12:
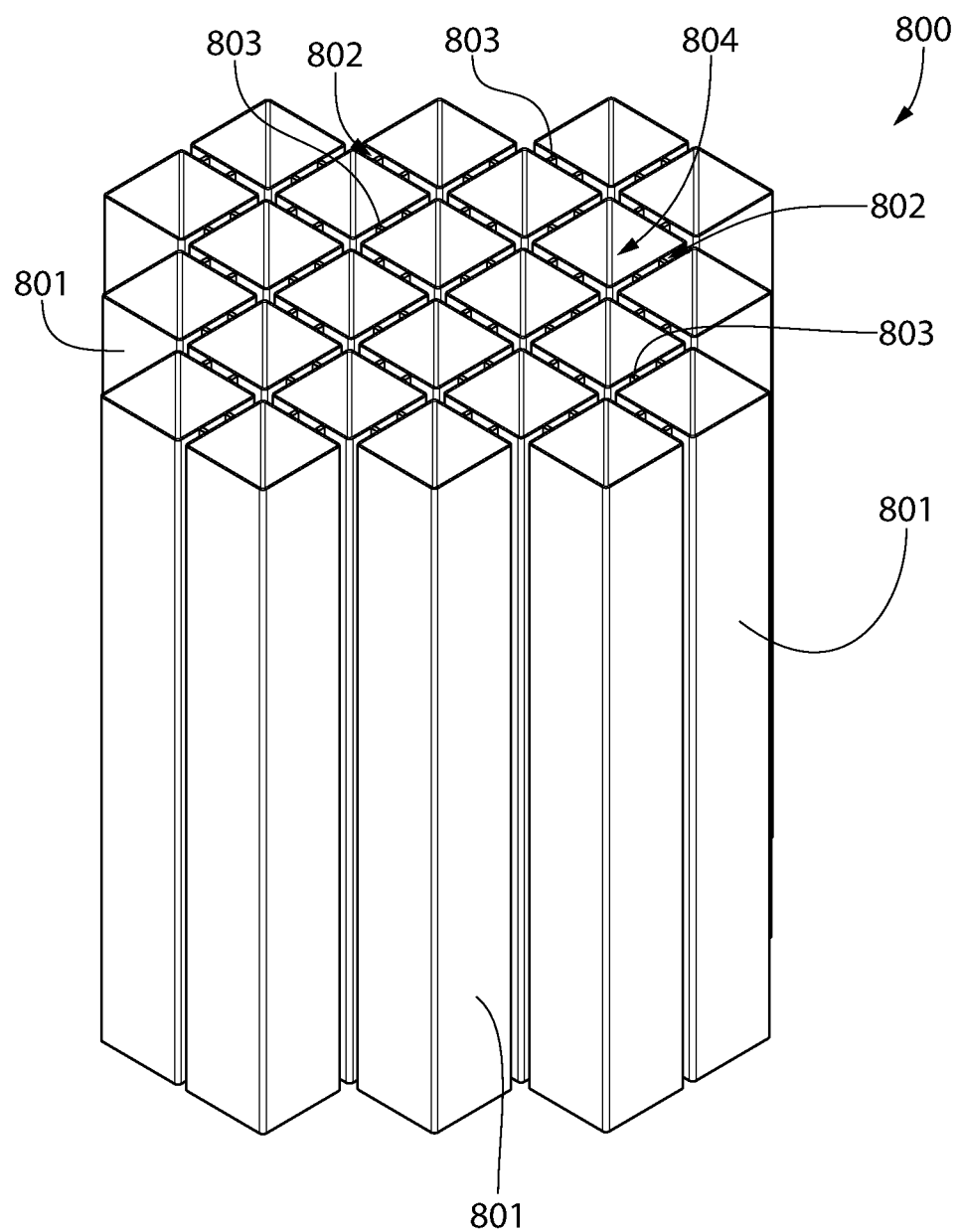
FIG. 12 is a perspective view of a portion of a basket assembly in accordance with a third alternative embodiment of the present invention.

Referring briefly to FIG. 12, an alternative basket apparatus 800 is illustrated. In FIG. 12, the basket apparatus 800 is not formed from slotted plates as with the previously described embodiments. Rather, in the exemplified embodiment the basket apparatus 800 is formed from a plurality of distinct elongated tubes 801 with square-shaped transverse-cross sections. Of course, as with the previously described embodiments, the transverse cross-sectional shape of the elongated tubes is not to be limiting in all embodiments and they may be triangular, rectangular, hexagonal, or the like in alternative embodiments. The elongated tubes 801 have inner surfaces that define a fuel cell 804 for the storage of fuel assemblies as has been described above. The elongated tubes 801 are arranged in an adjacent and spaced apart manner so that each of the elongated tubes 801 is at least partially, if not fully, surrounded by a flux trap 802.

In the exemplified embodiment, two reinforcement members 803 are depicted within each portion of the flux trap space 802 that surrounds one of the elongated tubes 801. The two reinforcement members 803 are offset from the center-point of the flux trap 802 within which they are positioned similar to the arrangement described with reference to FIGS. 7A and 7B above. Of course, the invention is not to be so limited and a single reinforcement member or more than two reinforcement members may be disposed within each portion of the flux trap space 802 as has been described in detail herein above. Thus, FIG. 12 is mainly intended to illustrate a different form of a basket assembly that is formed by elongated tubes rather than by slotted plates. All other features described above and below are applicable to both the embodiments that utilize slotted plates and those that utilize elongated tubes to form the basket assemblies.

Figure 13:
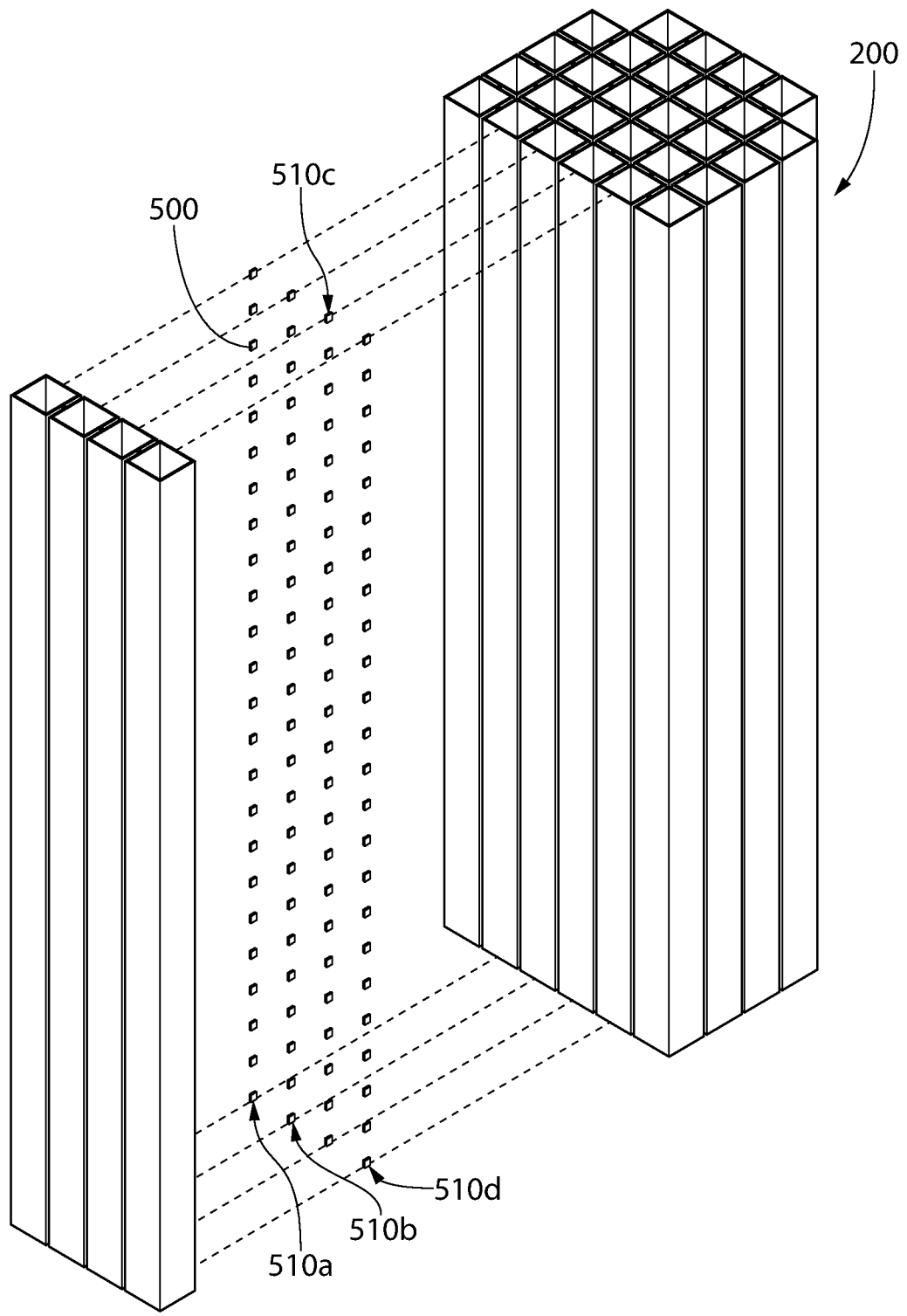
FIG. 13 is a partially exploded view of a basket apparatus and reinforcement members in accordance with an embodiment of the present invention.

Referring to FIG. 13, the fuel basket 200 is illustrated with a portion thereof exploded away so that the positioning of the reinforcement members 500 may be seen. In this embodiment, the fuel basket 200 is illustrated as being formed by separate tubes that are coupled together in a spaced apart manner thereby forming the flux traps therebetween. However, this same discussion is applicable to the embodiments described above whereby the basket apparatus 200 is formed by the wall plates 400. Thus, although in this embodiment the reinforcement slots, plate slots, and the like are omitted, they may be included in other embodiments and thus the description related to FIG. 13 is not intended to be limited to the specific embodiment shown, but rather may be relevant to all embodiments described herein.

In this embodiment, the reinforcement members 500 are arranged in groupings 510a-d (also referred to herein as longitudinal groups). Each grouping 510a-d is aligned along a longitudinal axis that is parallel to the longitudinal axis of the basket apparatus 200. Furthermore, in this embodiment each grouping 510a-d comprises a plurality of the reinforcement members 500 (distinct, separate components) that are axially spaced apart along the height of the basket apparatus 200. Stated another way, in this embodiment each of the groupings 510a-d comprises a subset of the reinforcement members 500 that are arranged in a spaced apart manner along an axis of that grouping 510a-d (also referred to herein as a group axis) that is substantially parallel to the longitudinal axis A-A of the basket apparatus 200. Each of the reinforcement members 500 may be coupled to the basket apparatus 200 in any number of ways. Specifically, the reinforcement members 500 may be coupled to the basket apparatus 200 utilizing the flange/slot arrangement described above with particular reference to FIGS. 10A-10C. Alternatively, the reinforcement members 500 may be coupled to the basket apparatus 200 via welding, bolting, combinations thereof, or other similar techniques.

Thus, in this embodiment the groupings 510a-d of the reinforcement members 500 are positioned within the flux traps 220 in an axially spaced apart manner along the height of the basket apparatus 200. As a result, the reinforcement members 500 take up less space within the flux traps 220 than if the reinforcement members 500 were not axially spaced apart. This may be desirable because maintaining a larger volume of empty space (either left empty or filled with a modulator) within the flux traps 220 may result in greater reactivity control and greater radiation shielding. The exact number of reinforcement members 500 within each of the groupings 500a-d and the exact spacing between the reinforcement members 500 is not limiting of the present invention in all embodiments. These design considerations may be made to achieve an appropriate balance between flux space volume, structural rigidity, deformation resistance, and the like. This arrangement utilizing groupings 510a-d of the reinforcement members 500 arranged in an axially spaced manner along an axis that is parallel to the longitudinal axis A-A of the basket apparatus 200 is also shown in cross-section in FIG. 2C.

Figure 2C:
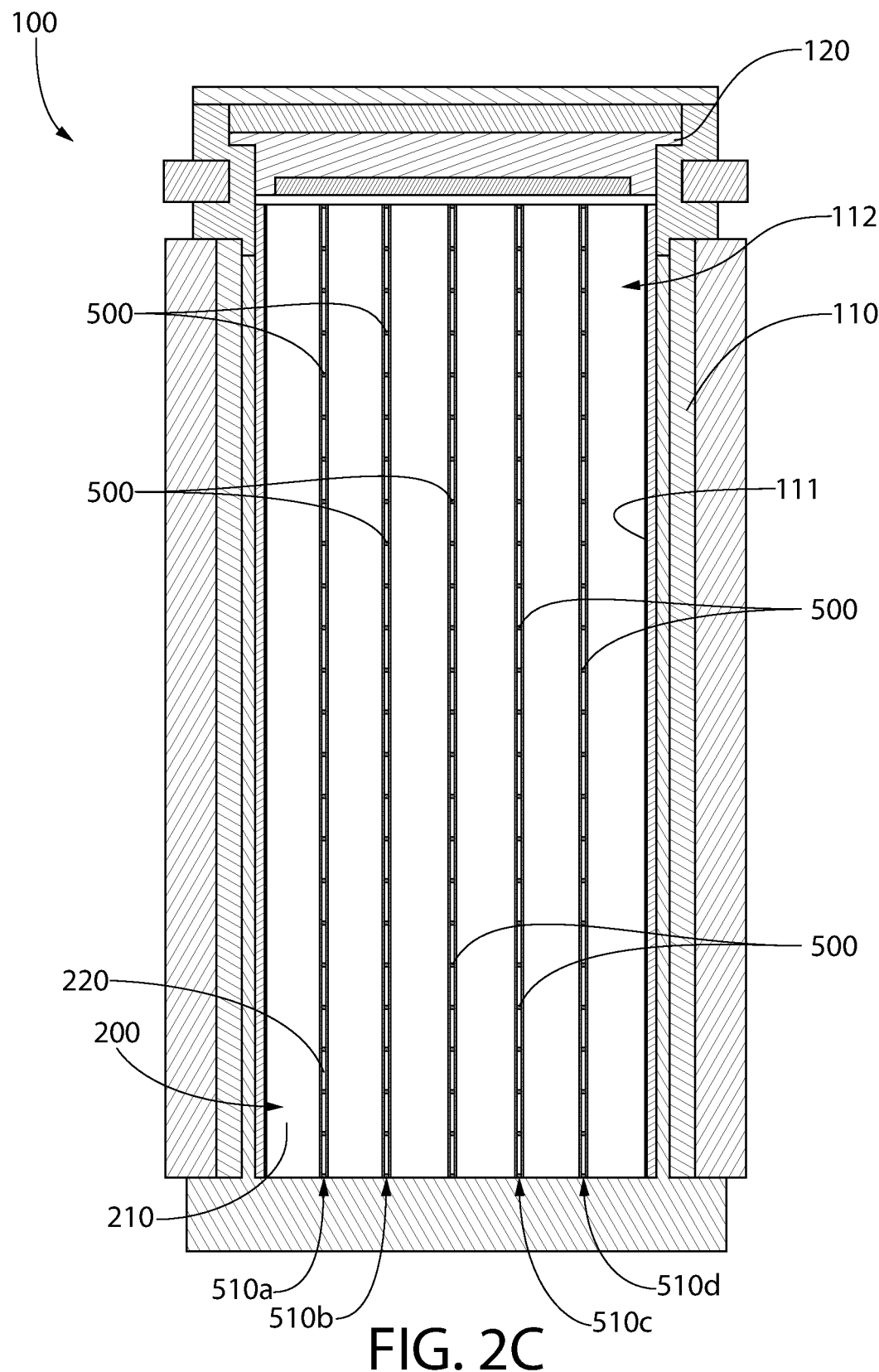
FIG. 2C is a cross-sectional view taken along line II-II of FIG. 1 showing an alternative basket apparatus within a cavity of the container.

Specifically, referring to FIG. 2C, in one embodiment a plurality of the reinforcement members 500 (i.e., a grouping 500a-d of the reinforcement members 500) may be positioned within each flux trap 220 in an axially spaced apart manner. Thus, the reinforcement members 500 may form a non-continuous support structure for the walls that define the flux trap 220. In another embodiment, the reinforcement members 500 may be elongated such that the body portion 501 of the reinforcement members 500 extends along a majority of or an entirety of the length of the flux trap 220. In such embodiment, rather than having a plurality of axially spaced apart reinforcement members 500, there may be a single elongated reinforcement member 500 within the flux trap 220 that extends along most or the entirety of the height of the flux trap 220. However, in some embodiments it may be preferable to use the plurality of spaced apart reinforcement members 500 because this may take up less of the flux trap 220 space, leaving more of the flux trap 220 space available for water or the like to provide radiation shielding.

Figure 14:
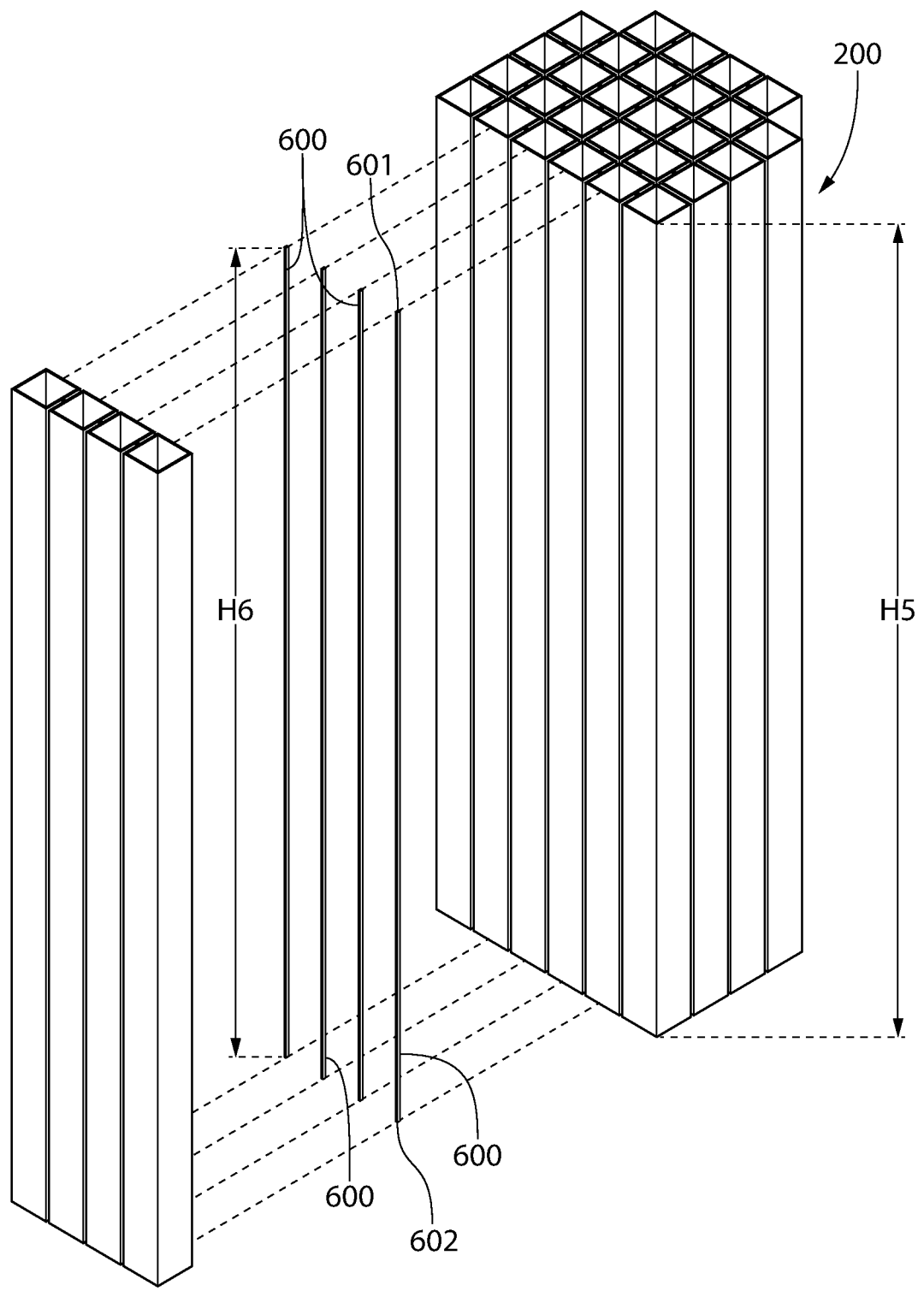
FIG. 14 is a partially exploded view of a basket apparatus and reinforcement members in accordance with another embodiment of the present invention.

Referring to FIG. 14, an alternative arrangement of the fuel basket 200 with reinforcement members 600 is illustrated. Again, although the fuel basket 200 is illustrated as being formed by separate tubular structures, the invention is not to be so limited and the concepts described below with reference to FIG. 14 may be applied to any flux trap fuel basket, including those formed using slotted plates described above.

The difference between this embodiment and those previously described, and specifically the embodiment described with reference to FIG. 13, is that the reinforcement members 600 are much taller than those previously described. Specifically, in this embodiment the basket apparatus 200 has a height H5 and the reinforcement members 600 have a height H6. In one embodiment, the height H6 of the reinforcement members 600 is the same as the height H5 of the basket apparatus 200. In another embodiment, the height H6 of the reinforcement members 600 may be slightly less than the height H5 of the basket apparatus 200. Thus, in this embodiment the reinforcement members 600 are singular structures that extend along the entire height of the basket apparatus 200 within the flux trap spaces thereof.

The reinforcement members 600 extend from a top end 601 to a bottom end 602. In some embodiments the reinforcement members 600 may be welded, bolted, or otherwise affixed to the basket apparatus 200 only at the tops and bottoms of the reinforcement members 600 adjacent the top and bottom ends 601, 602 of the reinforcement members 600. This may be sufficient to maintain the reinforcement member 600 within the flux trap without dislodging even during load situations. Thus, it is not necessary in all embodiments to make a connection between the reinforcement members 600 and the basket apparatus 200 along the entire length of the reinforcement members 600. Of course, in some embodiments the reinforcement members 600 may be coupled (welded, bolted, or the like) to the basket apparatus 200 along additional points of contact between the top and bottom ends 601, 602 of the reinforcement members 600.

Furthermore, combinations of the configuration of the groupings 510a-d of reinforcement members 500 shown in FIG. 13 and the reinforcement members 600 shown in FIG. 14 are also possible in some embodiments. Specifically, some of the flux trap spaces may have groupings 510a-d of the reinforcement members 500 and others of the flux trap spaces may have unitary reinforcement members 600 extending along the entire axial height of the flux trap spaces.

As noted above, the elongated reinforcement members 600 may be utilized in a basket apparatus 200 that is formed from slotted plates as discussed above. In such an embodiment, the reinforcement members 600 may extend from an upper-most wall plate 400 in the basket apparatus 200 to a bottom-most plate 400 in the basket apparatus 200. In this embodiment, the reinforcement members 600 may be physically coupled to only the upper-most wall plate 400 and the bottom-most wall plate 400 while not also being physically coupled to the wall plates 400 therebetween. Specifically, the reinforcement members 600 in this alternative embodiment may be welded, bolted, or the like to the upper-most wall plate 400 and to the lower-most wall plate 400. While the reinforcement member 600 will also abut and extend along all of the wall plates 400 between the upper and lower-most wall plates 400 in the basket apparatus 200, the reinforcement member 600 may not be physically welded, bolted, or the like to those additional wall plates 400. Of course, in alternative embodiments the reinforcement member 600 may be physically secured (via bolting, welding, mechanical mating, or the like) to more than just the upper and lower-most wall plates 400 in the basket apparatus 200.

In some embodiments the basket apparatuses may be formed entirely of neutron absorber material (i.e., the plates forming the basket apparatus may have a built-in neutron absorber material). In such embodiments, it may be preferable to add a stainless steel plate to the bottom and top of the basket apparatus (where the fuel rods are not located) so that the stainless steel plates form the bottom and top portions of the basket apparatus. Furthermore, in such embodiments it may be preferable to utilize a set of axial strips at the basket edges to join the top and bottom grids. The reinforcement members described herein may be made of stainless steel so that they can be welded to the top and bottom portions of the basket apparatus. Stainless steel reinforcement members may be preferable because they enable a thinner wall with equivalent strength, thereby leaving more of the flux space available for being filled with a moderator for criticality control.

The reinforcement member 500 described herein enables the panel thickness of the wall panels 400 to be reduced while allowing the structural response of the wall panels 400 to provide the required resistance during all regulatory loading events during storage, transport, or disposal because the reinforcement member 500 prevents wall deflection even with a thinner wall). The reactivity control is improved in this design since a small fraction of the removed wall panel 400 volume may be maintained as free-space for water influx during flooding events while the remainder of the volume is removed to allow a more compact basket design. The fact that the flux-trap basket apparatus 200 in this embodiment has thinner wall panels 400 compared to the non-flux trap basket design does not adversely affect the thermal performance since there are two panels between adjacent fuel assemblies, providing the same or more material for thermal conductivity.

While the inventive concepts described herein have been illustrated with a basket apparatus made up of square shaped fuel cells, the fundamental design concept disclosed herein is also applicable to fuel cells of rectangular and hexagonal cross section, and the like. Furthermore, while the inventive concepts described herein have been described with reference to flux trap fuel baskets, they may also be used in combination flux trap/non-flux trap iterations.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. An apparatus for supporting spent nuclear fuel, the apparatus comprising:
    a plurality of wall plates arranged in an intersecting manner to define a basket apparatus extending along a longitudinal axis, the basket apparatus comprising a plurality of fuel cells and a plurality of flux traps between adjacent ones of the fuel cells; and
    a plurality of reinforcement members positioned in the flux traps and extending between opposing ones of the wall plates that form the flux traps;
    wherein each of the wall plates is a slotted wall plate, the slotted wall plates interlocked with one another to form the basket apparatus;
    wherein each of the slotted wall plates comprises an upper edge, a lower edge, and a plurality of plate slots formed in each of the upper and lower edges, the plate slots of each of the slotted wall plates receiving intersecting ones of the slotted wall plates;
    wherein each of the slotted wall plates further comprises a plurality of reinforcement slots in at least one of the upper edge or the lower edge, the reinforcement slots of the slotted wall plates receiving flange portions of the reinforcement members.

2. The apparatus according to claim 1 wherein for each of the slotted wall plates, the plate slots have a first height and the reinforcement slots have a second height, the second height being less than the first height.

3. The apparatus according to claim 1 wherein each of the reinforcement members comprise a body portion and first and second flange portions protruding from opposite sides of the body portion; and wherein for each of the reinforcement members: (1) the first and second flange portions nest within the reinforcement slots of the opposing ones of the slotted wall plates between which the reinforcement member extends; and (2) the body portion abuts outer surfaces of the opposing ones of the slotted wall plates between which the reinforcement member extends, thereby maintaining a fixed distance between the opposing ones of the slotted wall plates between which the reinforcement member extends.

4. The apparatus according to claim 1 wherein for each of the slotted wall plates, the plates slots and the reinforcement slots are arranged in a pattern comprising a repeating sequence of:

> reinforcement slot>plate slot>plate slot.

5. The apparatus according to claim 1 wherein each of the fuel cells comprises a fuel cell axis that is substantially parallel to the longitudinal axis of the basket apparatus; and wherein for each adjacent pair of the fuels cells, a longitudinal reference plane that extends between and includes the fuel axes of the pair of the fuels cells intersects at least one of the reinforcement members.

6. The apparatus according to claim 1 wherein the reinforcement members comprises a first set of the reinforcement members and a second set of the reinforcement members; and wherein the first set of the reinforcement members are located adjacent a top end of the basket apparatus and the second set of the reinforcement members are located adjacent a bottom end of the basket apparatus.

7. The apparatus according to claim 6 wherein a first transverse reference plane intersects each of the reinforcement members of the first set and a second transverse reference plane intersects each of the reinforcement members of the second set; wherein a third transverse reference plane exits between the first and second transverse reference planes; and wherein the third transverse reference plane does not intersect any of the reinforcement members.

8. The apparatus according to claim 1 wherein each of the reinforcement members comprise a flat plate that extends substantially orthogonal to the opposing ones of the wall plates between which the reinforcement member extends.

9. The apparatus according to claim 1 further comprising:
the wall plates including a plurality of first wall plates, a plurality of second wall plates, and a plurality of third wall plates;
the first wall plates forming a top-most axial section of the basket apparatus;
the third wall plates forming a bottom-most axial section of the basket apparatus;
the second wall plates forming one or more middle axial sections of the basket apparatus;
wherein the second wall plates are formed of a metal matrix material having neutron absorbing particulate reinforcement; and
wherein the first and third wall plates are formed of stainless steel.

10. The apparatus according to claim 9 wherein the reinforcement members are formed of stainless steel and are located only in portions of the flux traps formed by the top-most axial section and the bottom-most axial section of the basket apparatus.

11. The apparatus according to claim 9 further comprising a plurality of fuel assemblies comprising a plurality of spent nuclear fuel rods supported between two end caps; and wherein the fuel assemblies are supported within the fuel cells so that the spent nuclear fuel rods do not extend into the top-most axial section and the bottom-most axial section of the basket apparatus.

12. The apparatus according to claim 1 wherein each of the reinforcement members is a T-shaped plate or a cruciform-shaped plate.

13. The apparatus according to claim 1 further comprising a container lid and a container body comprising a cavity, the basket apparatus positioned within the cavity of the container body.

14. The apparatus according to claim 13 further comprising a basket spacer circumscribing the basket apparatus and positioned between an inner wall surface of the container body and the basket apparatus.

15. An apparatus for supporting spent nuclear fuel, apparatus comprising:
a plurality of wall plates forming a basket apparatus comprising a plurality of fuel cells and a plurality of flux traps between adjacent ones of the fuel cells;
the basket apparatus extending along a longitudinal axis and comprising a top-most axial portion, a bottom-most axial portion, and a middle portion;
a first set of reinforcement members positioned in lower portions of the flux traps formed by the bottom-most axial portion of the basket apparatus, the reinforcement members of the first set extending between sections of opposing ones of the wall plates that form the lower portions of the flux traps;
a second set of reinforcement members positioned in upper portions of the flux traps formed by the top-most axial portion of the basket apparatus, the reinforcement members of the second set extending between sections of opposing ones of the wall plates that form the upper portions of the flux traps; and
a plurality of fuel assemblies disposed in the fuel cells, each of the fuel assemblies comprising a plurality of spent nuclear fuel rods supported between two end caps.

16. The apparatus according to claim 15 wherein the reinforcement members of each of the first and second sets comprise a flat plate that extends substantially orthogonal to the sections of the opposing ones of the wall plates between which the reinforcement members extend.

17. The apparatus according to claim 15 wherein each of the fuel cells comprises a fuel cell axis that is substantially parallel to the longitudinal axis of the basket apparatus; and wherein for each adjacent pair of the fuels cells, a longitudinal reference plane that extends between and includes the fuel axes of the pair of the fuels cells intersects at least one of the reinforcement members of each of the first and second sets.

18. The apparatus according to claim 15 wherein the fuel assemblies are supported within the fuel cells so that a transverse plane does not exist that intersects the spent nuclear fuel rods and the reinforcement members of either the first or second sets.

19. The apparatus according to claim 15 wherein the first set of reinforcement members are axially aligned with and spaced apart from the second set of reinforcement members.

20. The apparatus according to claim 15 wherein the reinforcement members of the first set are separate and distinct components than the reinforcement members of the second set.

21. The apparatus according to claim 15 wherein each of the reinforcement members is a T-shaped plate or a cruciform-shaped plate.

22. An apparatus for supporting spent nuclear fuel, the apparatus comprising:
a plurality of wall plates forming a basket apparatus comprising a plurality of fuel cells and a plurality of flux traps between adjacent ones of the fuel cells, the wall plates comprising reinforcement slots;
a plurality of reinforcement members, each of the reinforcement members comprising a body portion and first and second flange portions protruding from opposite sides of the body portion;
the reinforcement members positioned in the flux traps so that: (1) the first and second flange portions nest within the reinforcement slots of opposing ones of the wall plates that form the flux traps; and (2) the body portion abuts outer surfaces of the opposing ones of the wall plates, thereby maintaining a fixed distance between the outer surface of the opposing ones of the slotted wall plates.

23. The apparatus according to claim 22 wherein each of the reinforcement members is a T-shaped plate or a cruciform-shaped plate.

24. An apparatus for supporting spent nuclear fuel, the apparatus comprising:
- a plurality of wall plates forming a basket apparatus that extends along a longitudinal axis and comprises a plurality of fuel cells and a plurality of flux traps between adjacent ones of the fuel cells; and
- a plurality of reinforcement members positioned in the flux traps and extending between opposing ones of the wall plates that form the flux traps, the reinforcement members arranged in a plurality of longitudinal groups, each of the longitudinal groups comprising a subset of the reinforcement members arranged in a spaced apart manner along a group axis that is substantially parallel to the longitudinal axis;
- wherein each of the reinforcement members are configured to engage reinforcement slots formed in an upper edge or a lower edge of the wall plates.

25. The apparatus according to claim 24 wherein each of the reinforcement members is a T-shaped plate or a cruciform-shaped plate.

* * * * *